(12) United States Patent
Utakouji et al.

(10) Patent No.: US 7,881,659 B2
(45) Date of Patent: Feb. 1, 2011

(54) RADIO FREQUENCY REPEATER

(75) Inventors: Akira Utakouji, Kawasaki (JP);
Shinichi Kawashima, Kawasaki (JP);
Mitsuhiro Ono, Kawasaki (JP);
Kazutomo Tsuji, Kawasaki (JP);
Toshinao Oba, Shinagawa (JP)

(73) Assignee: Fujitsu Limited, Kawasaki (JP)

( * ) Notice: Subject to any disclaimer, the term of this patent is extended or adjusted under 35 U.S.C. 154(b) by 738 days.

(21) Appl. No.: 11/166,060

(22) Filed: Jun. 24, 2005

(65) Prior Publication Data

US 2006/0178106 A1 Aug. 10, 2006

(30) Foreign Application Priority Data

Feb. 4, 2005 (JP) ............... 2005-029556

(51) Int. Cl.
*H04B 7/15* (2006.01)
(52) U.S. Cl. ............ 455/11.1; 455/13.1; 455/15; 455/17
(58) Field of Classification Search ........ 455/11.1, 455/13.1, 15, 17, 7, 41.2, 41.3, 63.1, 67.13, 455/249.1, 279.1, 278.1, 448; 370/492, 501, 370/293, 315, 316
See application file for complete search history.

(56) References Cited

U.S. PATENT DOCUMENTS

| | | | | |
|---|---|---|---|---|
| 6,125,138 A | * | 9/2000 | Kumagai | .............. 375/219 |
| 6,658,263 B1 | * | 12/2003 | Ke et al. | .............. 455/524 |
| 6,868,254 B2 | * | 3/2005 | Weissman | .............. 455/11.1 |
| 2003/0003917 A1 | | 1/2003 | Copley et al. | |
| 2004/0208137 A1 | * | 10/2004 | Martinez | .............. 370/282 |
| 2005/0113046 A1 | * | 5/2005 | Liu | .............. 455/135 |

FOREIGN PATENT DOCUMENTS

| | | |
|---|---|---|
| EP | 1 445 876 | 8/2004 |
| JP | 10-22895 | 1/1998 |
| JP | 2000-31879 | 1/2000 |
| JP | 2000-269879 | 9/2000 |
| JP | 2002-198867 | 7/2002 |

OTHER PUBLICATIONS

European Search Report dated May 19, 2006.
Britecell Plus Product Specifications, Andrew Corporation.
Japanese Office Action dated Apr. 20, 2010, from the corresponding Japanese Application.

* cited by examiner

*Primary Examiner*—Edward Urban
*Assistant Examiner*—Fayyaz Alam
(74) *Attorney, Agent, or Firm*—Katten Muchin Rosenman LLP

(57) ABSTRACT

A radio frequency repeater equipment in a radio communication system is disclosed. An indoor space exists under a radio base station of the radio communication system, and a mobile terminal in the indoor space performs radio communications with the radio base station via the radio frequency repeater equipment, the radio frequency repeater equipment includes: a first antenna for receiving a DOWN LINK signal from the radio base station; a first attenuator for attenuating an output of the first antenna; a second antenna for outputting an output of the first attenuator, and for receiving a signal from the mobile terminal; and a second attenuator for attenuating an output of the second antenna.

2 Claims, 24 Drawing Sheets

RADIO FREQUENCY REPEATER

BACKGROUND OF THE INVENTION

1. Field of the Invention

The present invention generally relates to a signal transmission system and a signal transmission method. More particularly, the present invention relates to a radio frequency repeater in a signal transmission system used in a space in which plural radio systems exist concurrently.

2. Description of the Related Art

Since radio communication technologies have progressed in recent years, various radio communication systems have been proposed, and standardization and commercialization of the various radio communication systems are being carried out. Therefore, there are some cases where plural radio communication systems concurrently exist in the same region.

FIG. 1 is a schematic diagram showing a part of a space in which such plural radio communication systems exist. FIG. 1 shows plural mobile terminals 12-1, 2 and 3, plural antennas 14-1, 2 and 3, plural amplifiers 16-1, 2 and 3, a synthesizer/distributor 18, and a radio base station (node B) 20. The number of the antennas and he amplifiers can be arbitrarily determined. The mobile terminals 12-1~3 are placed in an indoor closed space 10, and each of the mobile terminals 12-1~3 performs radio communications using an antenna near the mobile station. Each of the antennas 14-1~3 is provided at a predetermined position. For example, the antennas 14-1~3 are placed at intervals of 20 meters. Alternatively, the antennas may be placed in different densities according to obstacles. Each of the amplifies 16-1~3 amplifies a signal that passes the amplifier. The synthesizer/distributor 18 synthesizes UP LINK signals from the antennas 14-1~3, and distributes DOWN LINK signals from the radio base station 20 to each antenna. The radio base station 20 is connected to a radio network controller (RNC) not shown in the figure.

For the sake of simplicity of description, it is assumed that the mobile terminal 12-1~3 and the radio base station 20 adopt a Wideband-Code Division Multiple Access (W-CDMA) scheme such as the IMT2000 system, and that radio communications other than the W-CDMA scheme such as a Personal Handy Phone System (PHS), the Personal Communication Service (PCS) system, a Wireless Local Area Network (WLAN) and the like can be performed in the indoor closed space 10. In addition, it is assumed that the plural antennas 14-1~3 are shared by the plural radio communications, and are used for both of transmitting and receiving. For the sake of simplicity, components such as a radio base station for PHS are not shown in the figure.

A DOWN LINK signal transmitted from the radio network controller (RNC) is received by the radio base station 20, sent to the synthesizer/distributor 18 via a transmission cable 19, and is distributed to each of the antennas 14-1~3 so that the distributed signals are transmitted to the mobile stations 12-1~3. The DOWN LINK signal is also called a downlink signal, outbound signal and the like. On the other hand, UP LINK signals from the mobile terminals 12-1~3 are received by the antennas 14-1~3, synthesized by the synthesizer/distributor 18, and are transmitted to the radio base station 20 via the transmission cable 19 so that the signals are transmitted to the radio network controller (RNC). The UP LINK signal is also called an uplink signal, an inbound signal and the like.

FIG. 2 is a schematic diagram showing frequency spectrums for the UP LINK signal received by an antenna (the antenna 14-2, for example) in the indoor closed space 10. FIG. 2 shows three frequency bands corresponding to three radio communications systems existing together. As shown in the figure, a band of 1920~1980 MHz is used by the W-CDMA scheme, a band of 1895~1920 MHz is used by the PHS, and a band of 2400~2497 MHz is used by the wireless LAN scheme. When plural mobile terminals operating under different radio communication systems are located nearly equidistant from the antenna, interference between the radio communication systems is small so that the mobile terminals can perform communications well under each communication system.

Japanese Laid-Open Patent Application No. 2002-198867 discloses a communication technology when plural radio communication systems exist concurrently.

However, plural mobile terminals operating under different radio communication systems are not necessarily always located nearly equidistant from the antenna. For example, as shown in FIG. 3, assuming that mobile terminals 32-1 and 2 (WiFi terminals conforming to the IEEE802.11b standard, for example) exist near the mobile terminal 12-2 that is performing radio communications using the antenna 14-2, and that the mobile terminal 32-2 is closer to the antenna 14-2 than the mobile terminal 12-2 is. In this case, as shown in FIG. 4, the signal for the wireless LAN becomes large in the antenna 14-2 so that a spurious component or an interference signal component that affects the communication signal for W-CDMA increases. In other words, a signal-to-noise ratio of the UP LINK signal transmitted from the mobile terminal 12-2 to the radio base station 20 deteriorates. The radio base station 20 or the upper radio network controller (RNS) instructs the mobile terminal 12-2 to transmit signals with a larger power to improve the signal quality of the mobile terminal 12-2. This instruction is transmitted by using a DOWN LINK signal. Then, the mobile terminal 12-2 performs radio communications with a larger transmission power.

In the W-CDMA scheme, since power control of the transmission power is properly performed for solving the near-far problem of the mobile terminal, there are few cases where a terminal of W-CDMA causes a large interference to another mobile terminal. However, such power control is not performed in radio communication systems other than the W-CDMA scheme. Therefore, there is a risk in that a signal from a radio communication system using a frequency band near that of the W-CDMA scheme may become a spurious signal for communications of the W-CDMA scheme.

By the way, the UP LINK signals from the antennas are synthesized by the synthesizer/distributor 18 shown in FIGS. 1 and 3, and, then, sent to the radio base station 20. Therefore, when a power of a signal transmitted via the antenna 14-2 increases, it is necessary to increase a power of each of signals from other antennas 14-1 and 3 in order to keep signal quality of the signals from the antennas 14-1 and 3. That is, when a power of the UP LINK signal from the antenna 14-2 is increased, noise level (noise floor) measured in the radio base station 20 increases, so that each mobile terminal is instructed to transmit signals with a larger power, or communication is prohibited (mobile terminals 12-1 and 3 shown in FIG. 3, for example). The reason is that the distance between the antenna and the mobile terminal in which communications can be performed decreases when it is requested that the antenna receives a signal with a larger power due to increase of the noise floor. From the view point of a communication capacity, since the number of connectable mobile terminals decreases, the communication capacity decreases. In addition, it can be predicted that the communication is likely to suffer interruptions. Further, since the mobile terminal transmits the signal with the larger power, consumed power increases, which is disadvantageous especially for a small-sized mobile terminal.

As to interference from other radio communication systems for a DOWN LINK signal, the interference can be effectively reduced by providing a band-pass filter in the antenna or by changing a power setting value in the network side or the like. However, as to the UP LINK signal, it is not easy to set such condition to take such measure in each mobile terminal distributed to each individual. Therefore, a technology for reducing or eliminating the above-problem for the UP LINK signal is required.

FIG. 5 shows antennas 16-1~3 in the indoor closed space 10, and cells 52-1~3 each indicating a region in which communication using a corresponding antenna can be performed in a normal state. The normal state is a state where there is no above-mentioned increase of the noise floor. Cells 54-1~3 smaller than the cells 52-1~3 indicate cells when the noise floor increases.

FIG. 6 shows a simulation result on a power received by an antenna using an indoor closed space model. The simulation result is under an environment in which visibility is good in the indoor closed space. The vertical axis indicates power level (dBm/MHz) when 50Ω termination. The lateral axis indicates one-line distance (meter) between the antenna and the mobile terminal. More strictly, the one-line distance is obtained as the square root of the sum of squares of a horizontal distance and a vertical distance between the antenna and the mobile terminal. In the simulation, the antenna in the indoor closed space is provided at a ceiling at a height of 3 meters above the floor. The curves in the figure are obtained by plotting a distance by which equal to or more than 90% of received power in the vertical axis can be kept under various conditions or models.

The curve 61 is a graph in a case where a mobile terminal of the W-CDMA scheme outputs an AMR signal (voice conversation signal) with a transmission power of 21 dBm, and the signal is attenuated with a space attenuation index 2. The space attenuation index 2 corresponds to a free space model in which a signal is attenuated in inverse proportion to a square of the distance.

The curve 62 is a graph in a case where a margin to a short section center value variation and shielding of waves due to movement of a human are considered in addition to the conditions for the curve 61. The radius of the cell is evaluated based on this graph.

The curve 63 is a graph showing effects of a spurious signal received by the antenna when a WiFi apparatus performs radio communications with a transmission power of 10 dBm while producing the spurious signal of −35 dBm. The space attenuation index is 2.

The curve 64 is a graph showing effects of a spurious signal received by the antenna when a WiFi apparatus performs radio communications with a transmission power of 10 dBm while producing the spurious signal of −60 dBm. The space attenuation index is 2.

The curve 65 is a graph showing effects of a spurious signal received by the antenna when a PHS terminal performs radio communications while producing the spurious signal of −21 dBm. The space attenuation index is 2.

The curve 66 is a graph showing effects of a spurious signal (251 nW/MHz) of a PHS terminal conforming to an improved standard.

As shown in the figure, the curves 64-66 are below the curve 62 in the full section. Therefore, when the PHS terminal or the WiFi terminal does not exist, or when the PHS terminal or the WiFi terminal exits only far from the antenna (at least when each terminal exists in nearly the same distance from the antenna), a relatively large cell radius such as equal to or more than 20 meters can be realized. However, the peak (−70 dBm/MHz) of the curve 63 is equivalent to a level near 18 meters of the curve 62. Therefore, when the WiFi terminal exists near the antenna (about 3 meters from the antenna), a radio wave emitted from a place at a distance of 18 meters or more from the antenna are blocked. Therefore, according to the simulation result, it can be understood that the cell radius is shrunk to about 18 meters.

FIG. 7 assumes the same conditions as FIG. 6 except that the indoor closed space is in poor visibility. Curves 71 to 76 are graphs obtained by using the same conditions or models as those of the curves 61 to 66 in FIG. 6. In FIG. 7, it can be understood that the attenuation rate of the signal is larger than that in FIG. 6. In FIG. 7, the peak (−70 dBm/MHz) of the curve 73 is equivalent to a level near 12 meters of the curve 72. Therefore, when the WiFi terminal exists near the antenna (about 3 meters from the antenna), a signal emitted from a place at a distance of 12 meters or more from the antenna does not satisfy a required SIR. Therefore, according to the simulation result, it can be understood that the cell radius is shrunk to about 12 meters.

SUMMARY OF THE INVENTION

The present invention is devised to solve at least one of the above-mentioned problems. An object of the present invention is to provide a technology for alleviating a problem in a transmission system in which an UP LINK signal received by an antenna shared by at least first and second radio communication systems is transmitted to a radio base station of at least the first radio communication system via a transmission cable, wherein the problem is in that a spurious power from at least the second radio communication system is mixed to the UP LINK signal so that a noise level measured in the radio base station increases, and the number of circuits that can be accommodated and a coverage radius decrease.

The object is achieved by a radio frequency repeater equipment a radio communication system, wherein an indoor space exists under a radio base station of the radio communication system, and a mobile terminal in the indoor space performs radio communications with the radio base station via the radio frequency repeater equipment, the radio frequency repeater equipment including:

a first antenna for receiving a DOWN LINK signal from the radio base station;

a first attenuator for attenuating an output of the first antenna;

a second antenna for outputting an output of the first attenuator, and for receiving a signal from the mobile terminal; and a second attenuator for attenuating an output of the second antenna.

According to the present invention, increase of a noise level measured in the radio base station due to mixing of a signal from the second radio communication system can be reduced in a signal transmission system for transmitting an UP LINK signal received by an antenna shared by the first radio communication system and the second radio communication system to the radio base station of the first radio communication system.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

Figure 1:
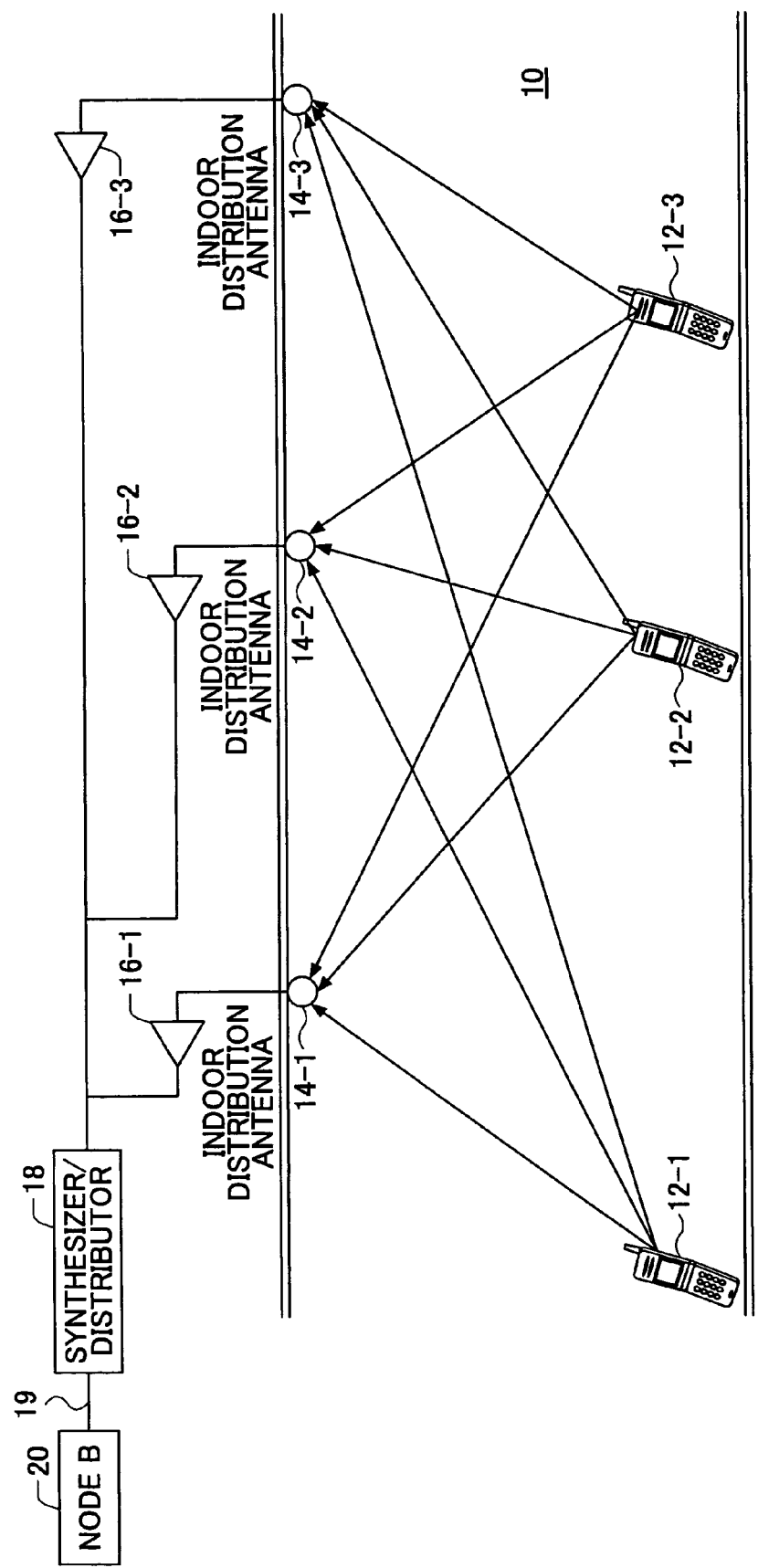
FIG. 1 is a schematic diagram showing a part of a space in which plural radio communication systems exist concurrently.
Figure 2:
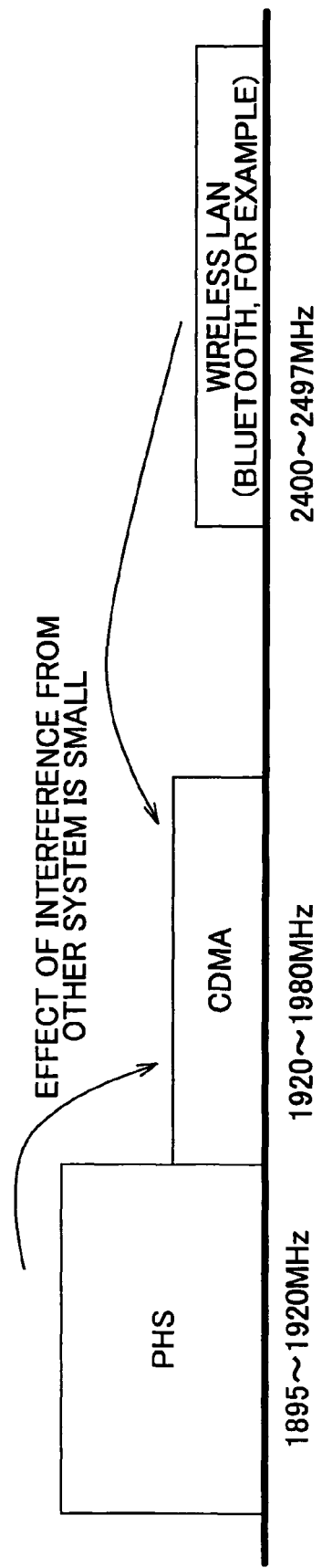
FIG. 2 is a schematic diagram showing frequency spectrums of UP LINK signals received by an antenna in an indoor closed space.

In the following, embodiments of the present invention are described with reference to figures.

Outline of the Embodiments

According to an embodiment of the present invention, an UP LINK signal received by an antenna shared by at least a first radio communication system and a second radio communication system is transmitted to at least a radio base station of the first radio communication system. A determination part determines whether a signal level of a signal, included in the UP LINK signal, from at least the second radio communication system exceeds a permissible level, and a level adjustment part adjusts a power level of the UP LINK signal to output an adjusted signal according to the determination result, and sends the adjusted signal to the radio base station. Accordingly, increase of a noise level measured in the radio base station due to mixing of a signal from the second radio communication system can be reduced at least.

According to an embodiment of the present invention, the first radio communication system operates under a CDMA scheme. Since increase of the noise level largely affects to control information for power control and the system capacity in the CDMA scheme, the method of the present invention for reducing the noise level is advantageous especially for the CDMA system.

According to an embodiment of the present invention, the radio communication system other than the first radio communication system is a PHS system, a PCS system, a system operating under TDD, or a LAN system. Since these communication systems do not perform power control of CDMA, the CDMA system is vulnerable to a spurious signal from these communication systems. Therefore, the present invention is advantageous especially for an environment in which the CDMA system and other communication systems are mixed.

According to an embodiment of the present invention, the antenna is provided in an indoor space. Since the spurious signal is easy to be mixed via an indoor shared antenna that is shared by plural systems. Therefore, the present invention is advantageous especially for a case where the antenna is a shared antenna provided in the indoor closed space.

According to an embodiment of the present invention, a radio access point is provided for performing signal conversion between a signal of the LAN system and a signal transmitted via the antenna, wherein the radio access point is connected to a transmission cable different from a transmission cable connecting between the radio base station and the level adjustment part. Since signal transmission in the upper side of the shared antenna is performed in LAN system and other systems separately, the communication capacity can be further improved. Since the antenna is shared, it is not essential to provide a specific antenna for LAN, so that the space in which the antenna is provided is not defiled.

According to an embodiment of the present invention, a synthesizing part for synthesizing outputs from each level adjustment part is provided. Even when the spurious signal is detected, it is reduced by the adjustment part and the adjusted signal is received by the synthesizing part, so that a large noise is not measured in the radio base station side.

According to an embodiment of the present invention, a detection part for detecting timing for switching between UP LINK and DOWN LINK lines in the second radio communication system operating under a TDD scheme is provided, and the determination part performs the determination in a period of time when the antenna receives an UP LINK signal from the second radio communication system. Accordingly, detection and reduction of the spurious signal can be performed in a period in which the spurious signal may be mixed, and the detection and reduction of the spurious signal is not performed in other periods.

According to an embodiment of the present invention, a signal transmission system including an antenna that is used for transmitting and receiving and that is connected, via a transmission cable, to a radio base station of a radio communication system operating under a TDD scheme is used. The signal transmission system includes: a detection part for detecting a synchronization pattern that is included in a DOWN LINK signal received from the radio base station via the transmission cable; and a part for determining timing for switching between sending and receiving. Detection of the synchronization pattern can be performed in the outside of the radio base station. For example, detection of the synchronization pattern can be performed near the shared antenna. Therefore, different from the conventional scheme, it is not necessary to send a transmit/receive switching signal from the radio base station to the antenna. That is, it is not necessary to provide a control signal line from the radio base station to the antenna, or to keep communication resources for radio-transmission for the transmit/receive switching signal.

In the following, embodiments of the present invention are described with reference to figures. In the figures, the same reference numerals are used to identify corresponding features.

Figure 8:
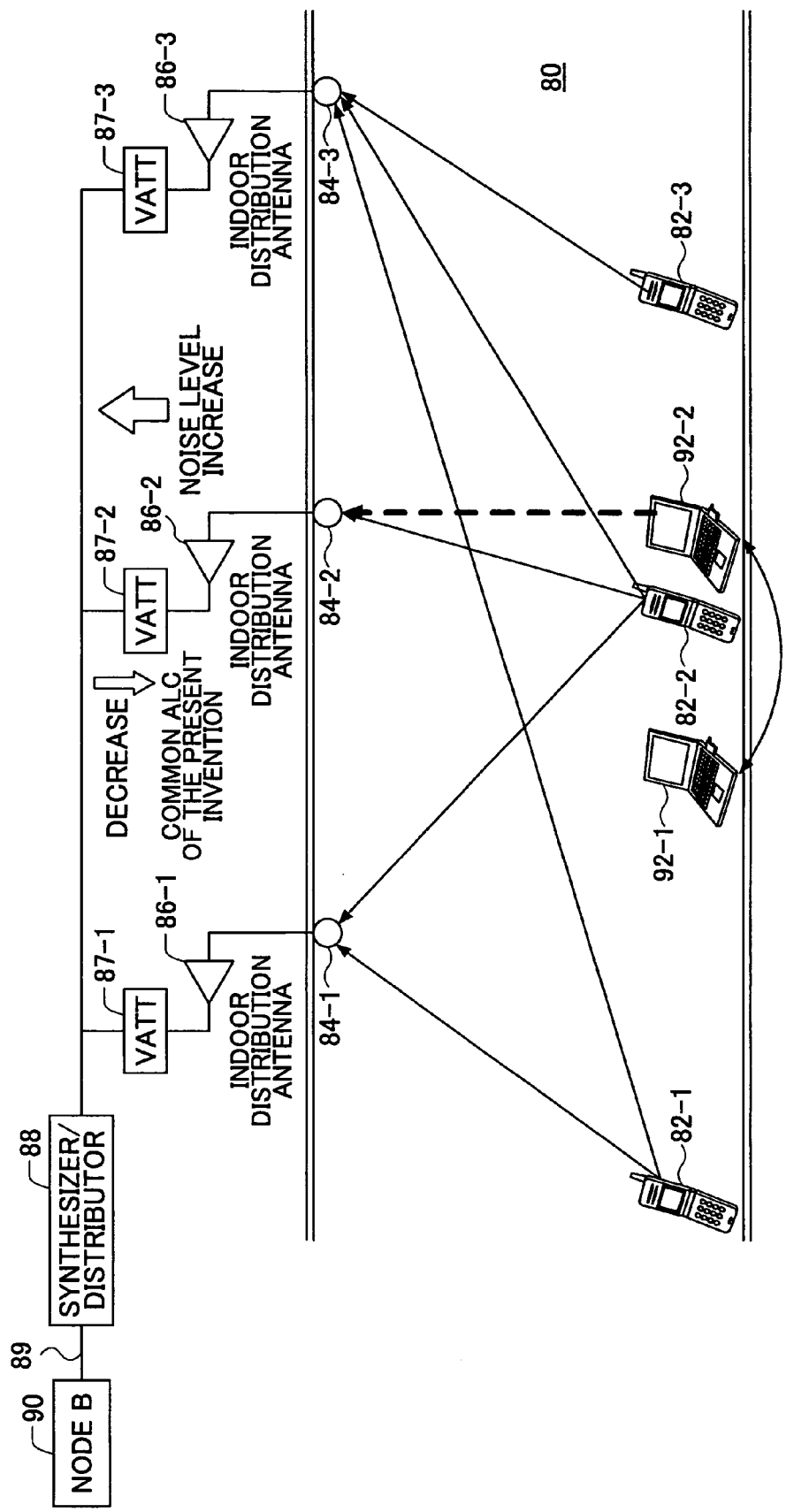
FIG. 8 is a diagram showing a signal transmission system according to an embodiment of the present invention.

FIG. 8 is a schematic diagram showing a part of a space in which plural radio communication systems exist. FIG. 8 shows plural mobile terminals 82-1, 2 and 3, plural antennas 84-1, 2 and 3, plural amplifiers 86-1, 2 and 3, variable attenuators 87-1~3, a synthesizer/distributor 88, and a radio base station 90. The number of the mobile terminals, antennas, amplifiers and variable attenuators can be arbitrarily determined. The mobile terminals 82-1~3 are placed in an indoor closed space 80, and each of the mobile terminals 82-1~3 performs radio communications using an antenna near the mobile terminal. Each of the antennas 84-1~3 is provided at a predetermined position. For example, the antennas 84-1~3 are placed at intervals of 20 meters. Alternatively, the antennas may be placed in different densities according to obstacles. Each of the amplifies 86-1~3 amplifies a signal that passes the amplifier. Each of the variable attenuators 87-1~3 decreases a power of an UP LINK signal that passes through the variable attenuator when a spurious signal included in the UP LINK signal exceeds a predetermined level. The configuration and operation of the variable attenuator are described later in detail. The synthesizer/distributor 88 synthesizes UP LINK signals from the antennas 84-1~3, and distributes a DOWN LINK signal from the radio base station 90 to each antenna. The radio base station 90 is connected to a radio network controller (RNC) not shown in the figure.

Similar to the case shown in FIG. 1, it is assumed that the mobile terminals 82-1~3 and the radio base station 90 adopt the Wideband-Code Division Multiple Access (W-CDMA) scheme such as the IMT2000 system, and that radio communications other than the W-CDMA scheme such as the Personal Handy Phone System (PHS), the Personal Communication Service (PCS), the Wireless Local Area Network (WLAN) and the like can be performed in the indoor closed space 10. In addition, it is assumed that the plural antennas 84-1~3 are shared by the plural radio communications, and are used for both of transmitting and receiving. For the sake of simplicity, components such as a radio base station for PHS are not shown in the figure.

A DOWN LINK signal transmitted from the radio network controller (RNC) is received by the radio base station 90, sent to the synthesizer/distributor 88 via a transmission cable 89, and is distributed to each of the antennas 84-1~3 so that the distributed signals are transmitted to the mobile stations 82-1~3. On the other hand, UP LINK signals from the mobile terminals 82-1~3 are received by the antennas 84-1~3, synthesized by the synthesizer/distributor 88, and are transmitted to the radio base station 90 via the transmission cable 89 so that the signals are transmitted to the radio network controller (RNC).

As shown in FIG. 8, assuming that mobile terminals 92-1 and 2 (WiFi terminals conforming to the IEEE802.11b standard, for example) exist near the mobile terminal 82-2 that is performing radio communications using the antenna 84-2, and that the mobile terminal 92-2 is closer to the antenna 84-2 than the mobile terminal 82-2 is. In this case, the noise floor increases according to the conventional technology. However, this problem is eliminated in this embodiment as described in the following.

Figure 3:
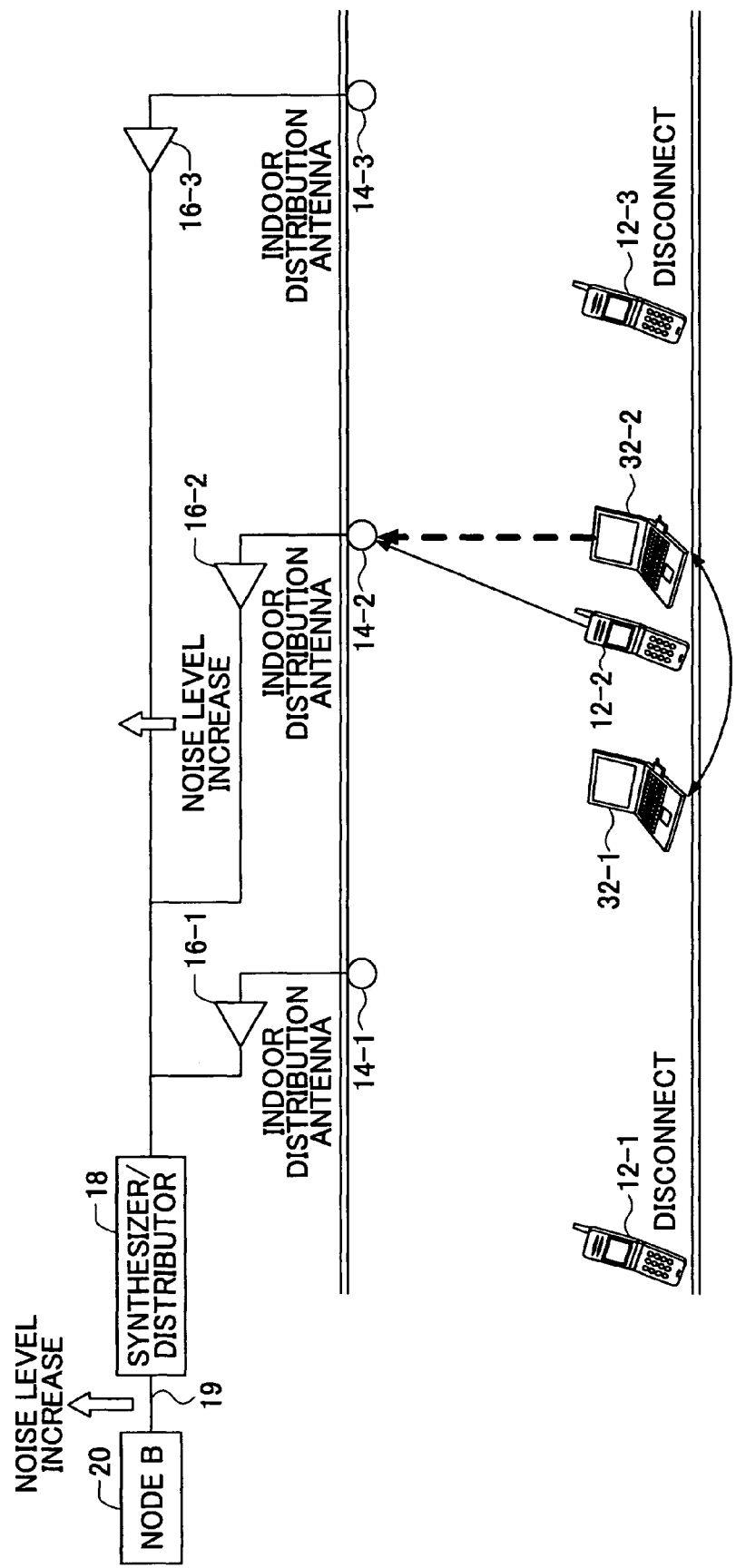
FIG. 3 is a schematic diagram showing a part of a space in which plural radio communication systems exist concurrently.
Figure 4:
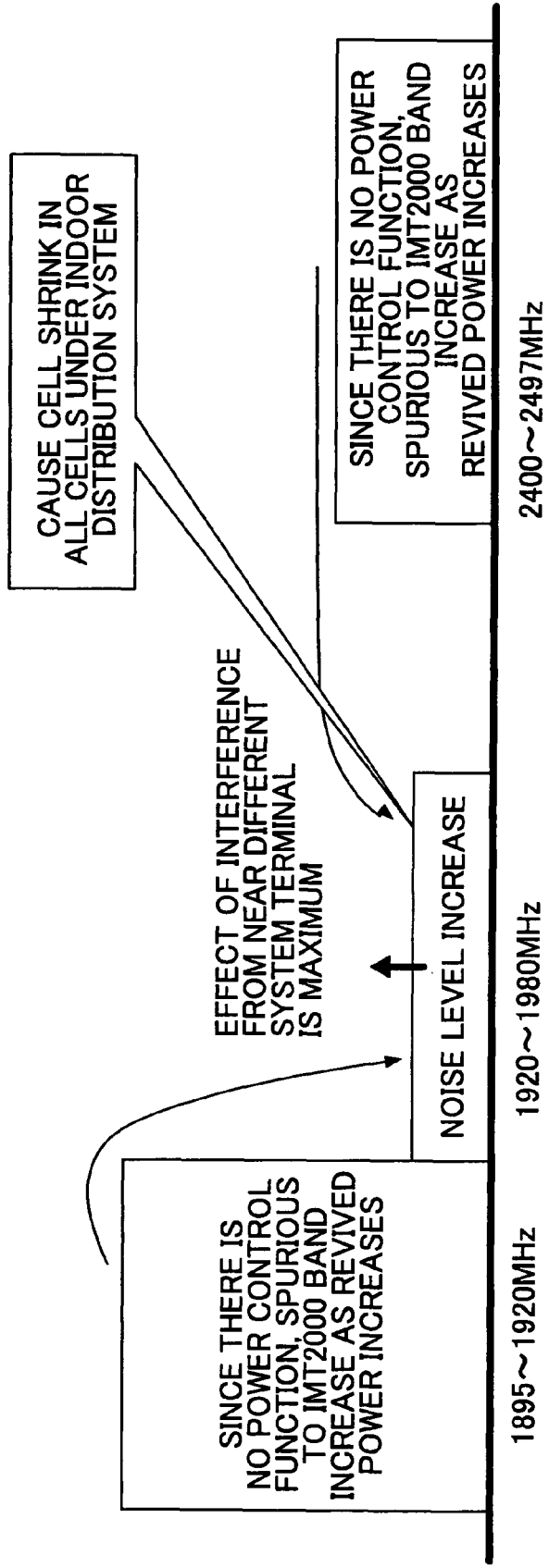
FIG. 4 is a schematic diagram showing frequency spectrums of UP LINK signals received by an antenna in an indoor closed space.
Figure 5:
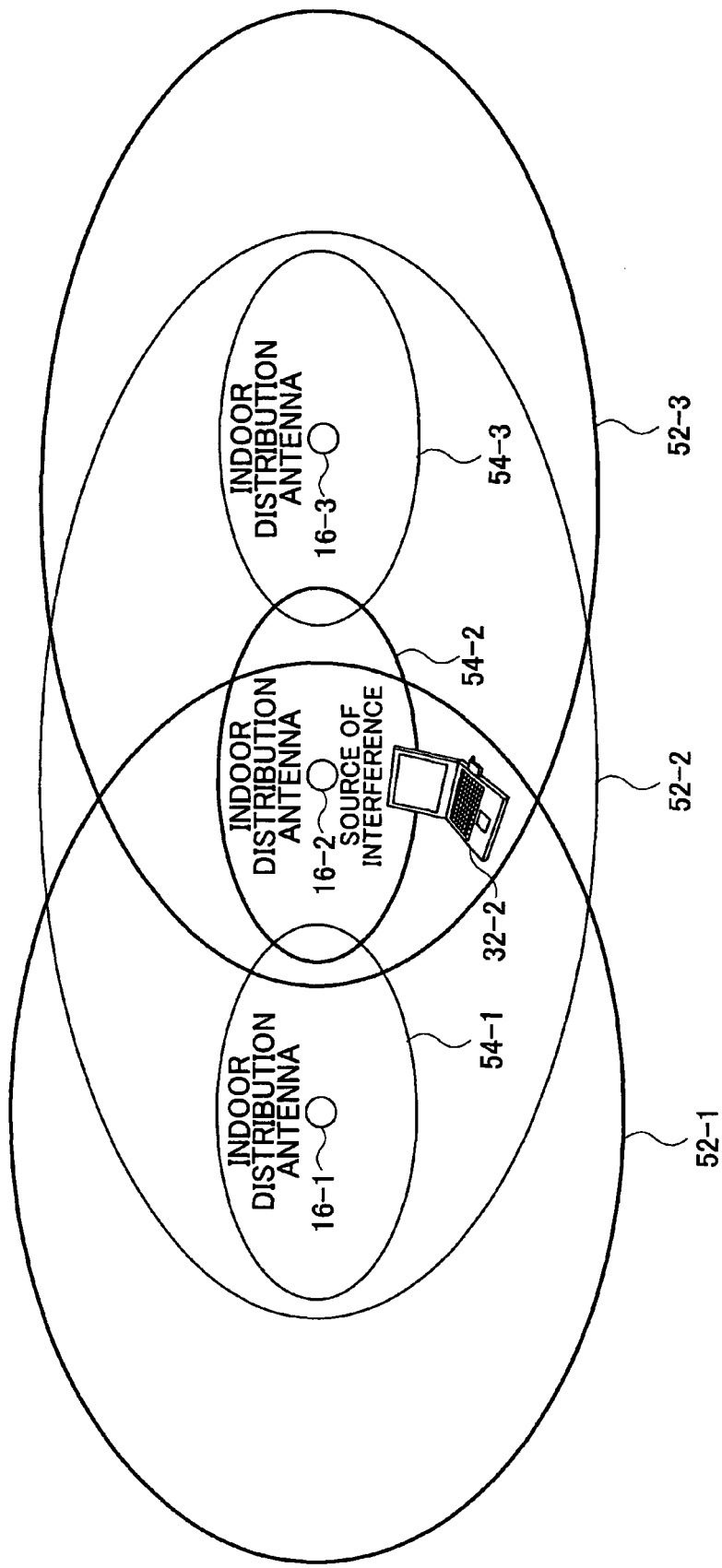
FIG. 5 is a schematic diagram showing cells in the indoor closed space.
Figure 6:
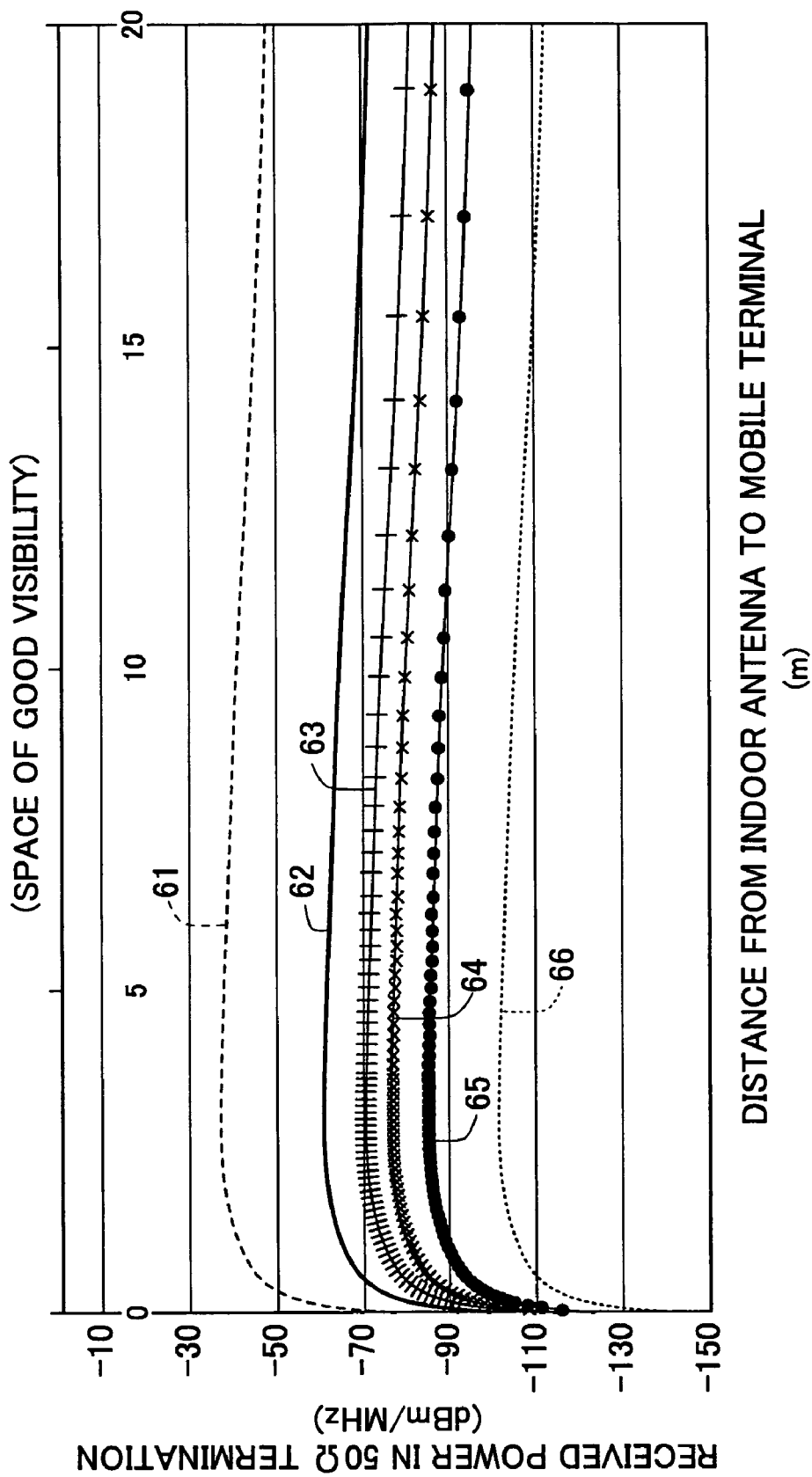
FIG. 6 shows simulation results on a received power in an indoor closed space of good sight visibility.
Figure 7:
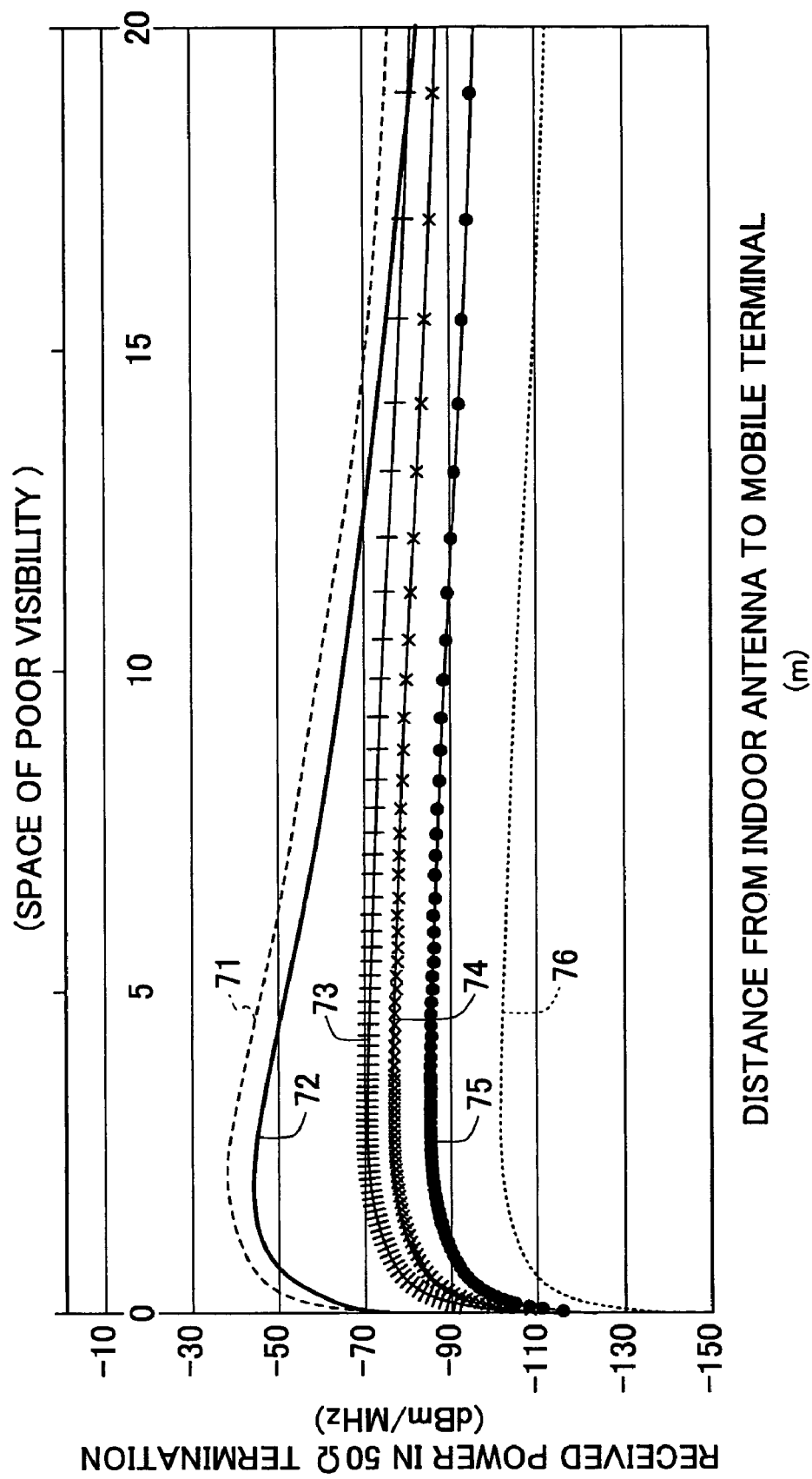
FIG. 7 shows simulation results on a received power in a visible indoor closed space of poor sight visibility.

The UP LINK signal received by the antenna 84-2 is monitored by a component not shown in FIG. 8, so that it is determined whether a spurious signal from a radio communication system other than the W-CDMA scheme is included in the UP LINK signal exceeding a permissible level. If the spurious signal exceeding the permissible level is not included, the UP LINK signal is transmitted to the synthesizer/distributor 88. When the spurious signal is included, the power of the UP LINK signal received by the antenna 84-2 is attenuated by the variable attenuator 87-2. The UP LINK signal in which the power has been attenuated is sent to the synthesizer/distributor 88, and is synthesized with UP LINK signals from other antennas so as to be transmitted to the radio base station 90. Since the power of the UP LINK signal including the large spurious signal is reduced and the reduced signal is transmitted to the radio base station 90, the noise level measured in the radio base station or in the upper apparatus does not increase. Therefore, different from the case of FIG. 3, the mobile terminals 82-1 and 3 can continue to perform communications via the antennas 84-1 and 3. As to the mobile terminal 82-2, the communication quality may degrades, communication interruptions may increase, or the communication may be disconnected. However, according to the present embodiment, more serious disadvantage in that the spurious signal is included via the antenna 84-2 so that the noise floor is increased and the communication capacity is decreased can be effectively avoided.

Each of the variable attenuators 87-1~3 may be an attenuator having a simple attenuation function, or may be an amplifier that can change signal level. Further, the amplifier (86-1~3) and the variable attenuator (87-1~3) are not strictly differentiated. According to cases, each of them may be provided, or they may be integrated.

First Embodiment

Figure 9:
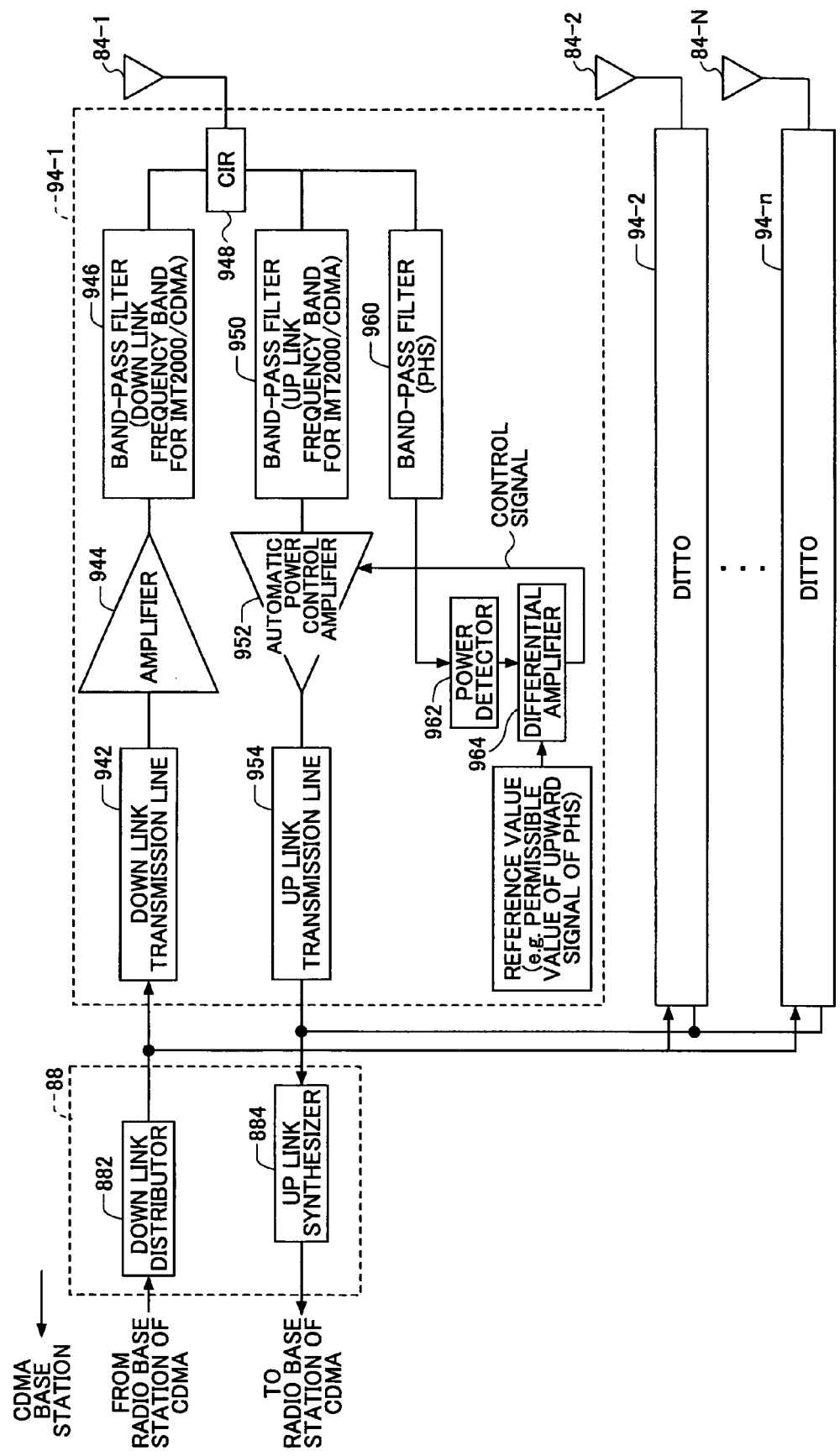
FIG. 9 is a block diagram showing a signal transmission system according to an embodiment of the present invention.

FIG. 9 is a schematic block diagram of a signal transmission system according to an embodiment of the present invention. The signal transmission system includes the synthesizer/distributor 88 shown in FIG. 8, plural signal processing parts 94-1~N, and plural antennas 84-1~N shown in FIG. 8, wherein N is a natural number. The synthesizer/distributor 88 includes a distributor 882 for DOWN LINK signals and a synthesizer 884 for UP LINK signals. Since each of the signal processing parts 94-1~N has the same configuration and operates similarly, a first signal processing part 94-1 is described as an example. The signal processing part 94-1 includes a transmission line 942 (such as coaxial cable line, optical fiber line, radio transmission line and the like) for DOWN LINK signals, an amplifier 944, a band-pass filter 946, a circulator 948, a band-pass filter 950, an automatic power amplifier 952, a transmission line 954 (such as coaxial cable line, optical fiber line, radio transmission line and the like) for UP LINK signals, a band-pass filter 960, a power detector 962 and a differential amplifier 964.

In the example shown in FIG. 9, the distributor 882 for DOWN LINK signals in the synthesizer/distributor 88 distributes DOWN LINK signals received from the radio base station (node B, not shown in FIG. 9) to the signal processing part. The synthesizer 884 for UP LINK signals synthesizes UP LINK signals received from the signal processing parts 94-1~N and transmits a synthesized signal to the radio base station.

The signal processing part 94-1 performs level control and noise reducing processes and the like on a DOWN LINK signal to be sent from the first antenna 84-1 and an UP LINK signal received by the antenna. The transmission lines 942 and 964 are transmission media for transmitting a signal from or to the radio base station as a signal form such as an electrical signal, an optical signal, a radio signal or the like. More specifically, each of the transmission lines 942 and 964 is formed by a coaxial cable, an optical fiber, a radio channel or the like each end of each of the transmission lines 942 and 954 is provided with a component for converting the signal form such as an optical-electrical (O/E) converter, an electrical-optical (E/O) converter, a protocol converter or the like as necessary.

The amplifier 944 properly amplifies the power level of the DOWN LINK signal.

Each of the band-pass filters 946 and 950 removes unnecessary frequency components from the DOWN LINK signal based on the band (1920~1980 MHz, for example) used in the W-CDMA scheme.

The circulator 948 switches the state of the transmit/receive shared antenna 84-1 between transmitting and receiving.

The automatic power amplifier 952 adjusts the power level of the UP LINK signal according to a control signal.

The band-pass filter 960 removes unnecessary frequency components from the DOWN LINK signal based on the band (1895~1920 MHz, for example) used in PHS.

The power detector 962 detects that a signal component of PHS is included in the UP LINK signal, in other words, detects that a spurious signal is included in the UP LINK signal.

The differential amplifier 964 functions as a comparator for comparing the level of the spurious signal component with a reference value, and generates the control signal to be supplied to the automatic power amplifier 952.

Figure 10:
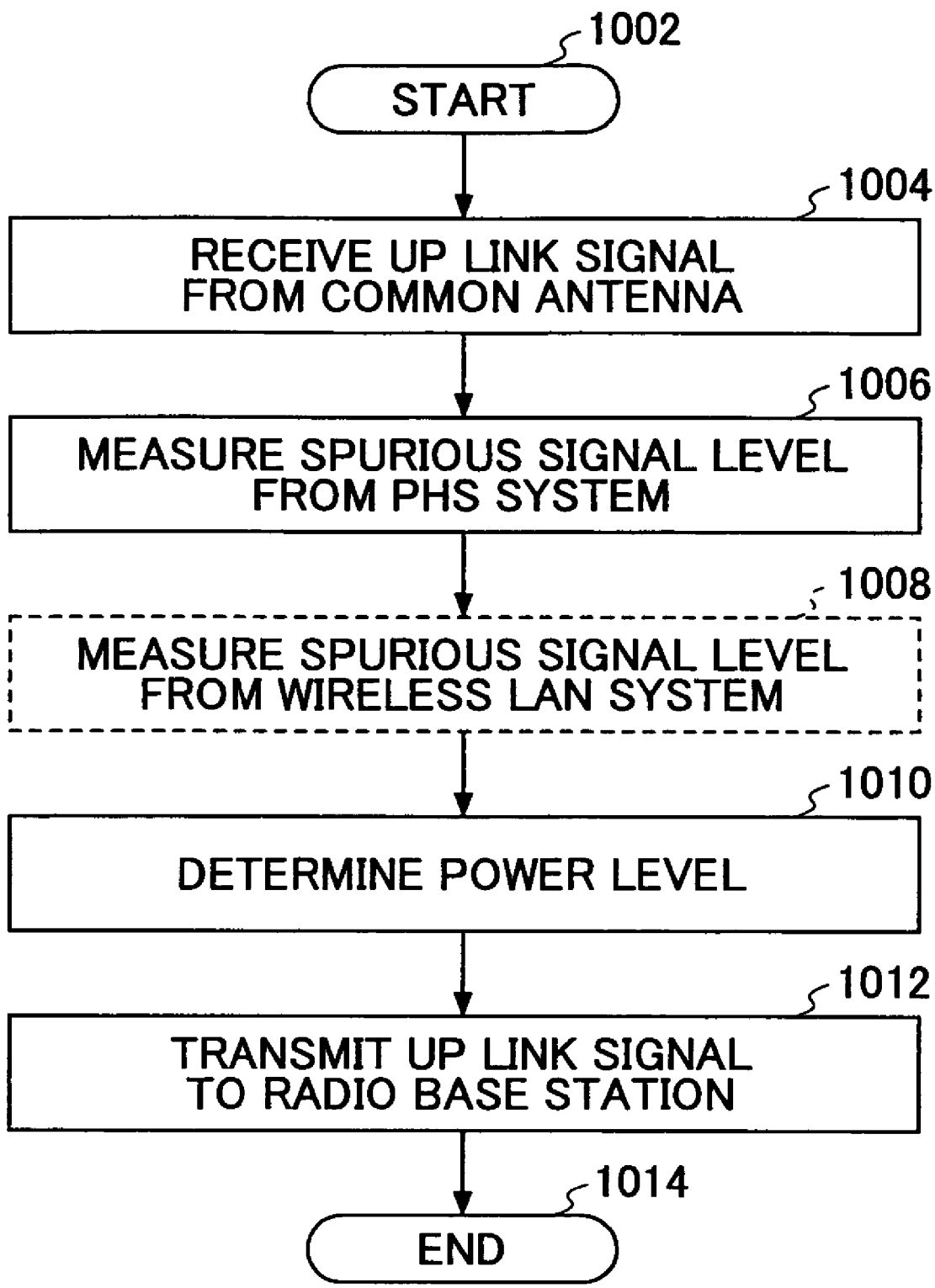
FIG. 10 is a flowchart showing an operation outline in the signal transmission system shown in FIG. 9.

FIG. 10 is a flowchart showing an operation outline in the signal transmission system shown in FIG. 9. Since the present invention mainly relates to the UP LINK signal, descriptions on the DOWN LINK signal are not presented. The flow starts from a step 1002 and goes to a step 1004.

In step 1004, the (transmit/receive sharing) antenna 84-1 receives an UP LINK signal from a mobile terminal operating under the W-CDMA scheme.

In step 1006, it is determined whether the spurious signal from PHS included in the UP LINK signal exceeds a permissible level. More specifically, the UP LINK signal is received by the band-pass filters 950 and 960 via the antenna 84-1 and the circulator. The band-pass filter 950 extracts a signal of the band of the W-CDMA scheme. The band-pass filter 960 extracts a signal of the band of PHS. The extracted signal is detected by the power detector 962.

The process in step 1008 is not performed in this embodiment, and is described in an after-mentioned embodiment.

In step 1010, a control signal for controlling the output level of the automatic power control amplifier 952 is generated so that the power level is determined. The signal component (spurious signal component) of PHS detected in the power detector 962 is supplied to the differential amplifier 964, and it is determined whether the signal component exceeds a predetermined reference value (permissible level). When the signal component exceeds the predetermined reference value, the control signal is set such that the automatic power control amplifier 952 attenuates the supplied UP LINK signal. The amount by which the UP LINK signal is attenuated can be properly determined according to usage. For example, the attenuation amount can be determined according to the level of the spurious signal, or the attenuation amount may be fixed (as −10 dB, for example) irrespective of the level of the spurious signal. Further, the power level itself may be changed, an amplifying ratio of the amplifier may be changed, or both of the power level and the amplifying ratio may be adjusted.

When the spurious signal component does not exceed the predetermined reference value, the control signal is set such that the automatic power control amplifier 952 amplifies the supplied UP LINK signal in the same way as the conventional technology.

In step 1012, the UP LINK signal in which the power level has been adjusted is transmitted to the radio base station, and the flow goes to step 1014, and the process ends.

Second Embodiment

Figure 11:
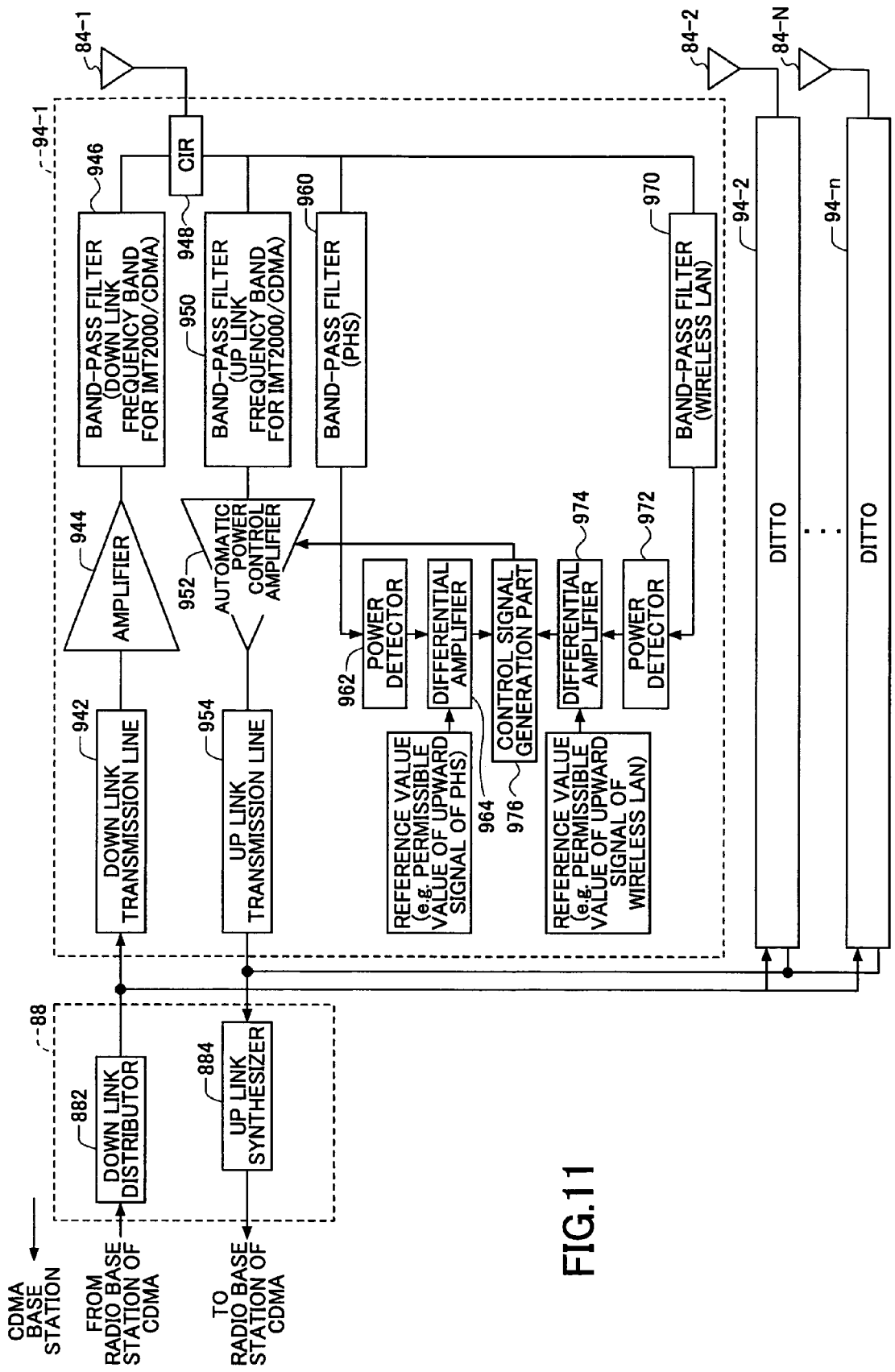
FIG. 11 is a schematic block diagram of a signal transmission system according to an embodiment of the present invention.

FIG. 11 is a schematic block diagram of a signal transmission system according to an embodiment of the present invention. In FIG. 11, the same reference numerals of FIG. 9 are used to identify corresponding features. The signal processing part 94-1 in this embodiment includes components that have been described, in addition to those, it includes a band-pass filter 970, a power detector 972, a differential amplifier 974 and a control signal generation part 976.

The band-pass filter 970 removes unnecessary frequency components from the UP LINK signal based on the band (2400~2497 MHz, for example) used in the radio communication system of the wireless LAN scheme.

The power detector 972 detects that a signal component from the radio communication system of the wireless LAN scheme is included in the UP LINK signal, in other words, detects that a spurious signal is included in the UP LINK signal.

The differential amplifier 974 functions as a comparator for comparing the level of the spurious signal component with a reference value, and a comparison result is supplied to the control signal generation part 976. The comparison result from the differential amplifier 964 is also supplied to the control signal generation part 976.

The control signal generation part 976 determines information of the control signal to be supplied to the automatic power control amplifier 952 based on the comparison results from the differential amplifiers 964 and 974. For example, the information of the control signal may be determined based on a larger one between spurious signals from PHS and wireless LAN. Or, the information of the control signal may be determined based on both of the spurious signals.

The signal transmission method shown in FIG. 10 can be also used in the signal transmission system of FIG. 11. The flow starts from a step 1002 and goes to a step 1004.

In the step 1004, the (transmit/receive sharing) antenna 84-1 receives an UP LINK signal from a mobile terminal operating under the W-CDMA scheme.

In step 1006, it is determined whether the spurious signal from PHS included in the UP LINK signal exceeds a permissible level. More specifically, the UP LINK signal is received by the band-pass filters 950 and 960 via the antenna 84-1 and the circulator. The band-pass filter 950 extracts a signal of the band of the W-CDMA scheme. The band-pass filter 960 extracts a signal of the band of PHS. The extracted signal is detected by the power detector 962.

In step 1008, it is determined whether the spurious signal from the radio communication system of the wireless LAN scheme included in the UP LINK signal exceeds a permissible level. The UP LINK signal is also received by the band-pass filter 970 via the antenna 84-1 and the circulator. The radio band-pass filter 970 extracts a signal of the band of the wireless LAN scheme. The extracted signal is detected by the power detector 972.

Although the step 1008 is shown after the step 1006 in the flowchart of FIG. 10 for the sake of convenience for description, the order of the steps may be inverted, or the whole or a part of these operations may be performed at the same time.

In step 1010, a control signal for controlling the output level of the automatic power control amplifier 952 is generated based on the comparison results from the differential amplifiers 964 and 974 so that the power level is determined. For example, information of the control signal is determined one of or both of the spurious signals from radio communication systems of PHS and wireless LAN scheme.

The spurious signal components caused by signals of PHS and wireless LAN are supplied to the differential amplifiers 964 and 974 respectively, and it is determined whether the signal component exceeds a predetermined reference value (permissible level). When one of the spurious signals caused by signals of PHS and wireless LAN exceeds the predetermined reference value, the control signal is generated based on the spurious signal and the automatic power control amplifier 952 attenuates the UP LINK signal supplied to it. When both of the spurious signals exceed the predetermined reference value, the control signal is generated based on a larger spurious signal and the automatic power control amplifier 952 attenuates the UP LINK signal supplied to it, for example.

When any of the spurious signals does not exceed the predetermined reference value, the control signal is set such that the automatic power control amplifier 952 amplifies the supplied UP LINK signal in the same way as the conventional technology.

In step 1012, the UP LINK signal in which the power level has been adjusted is transmitted to the radio base station, and the flow goes to step 1014, and the process ends.

Third Embodiment

Figure 12:
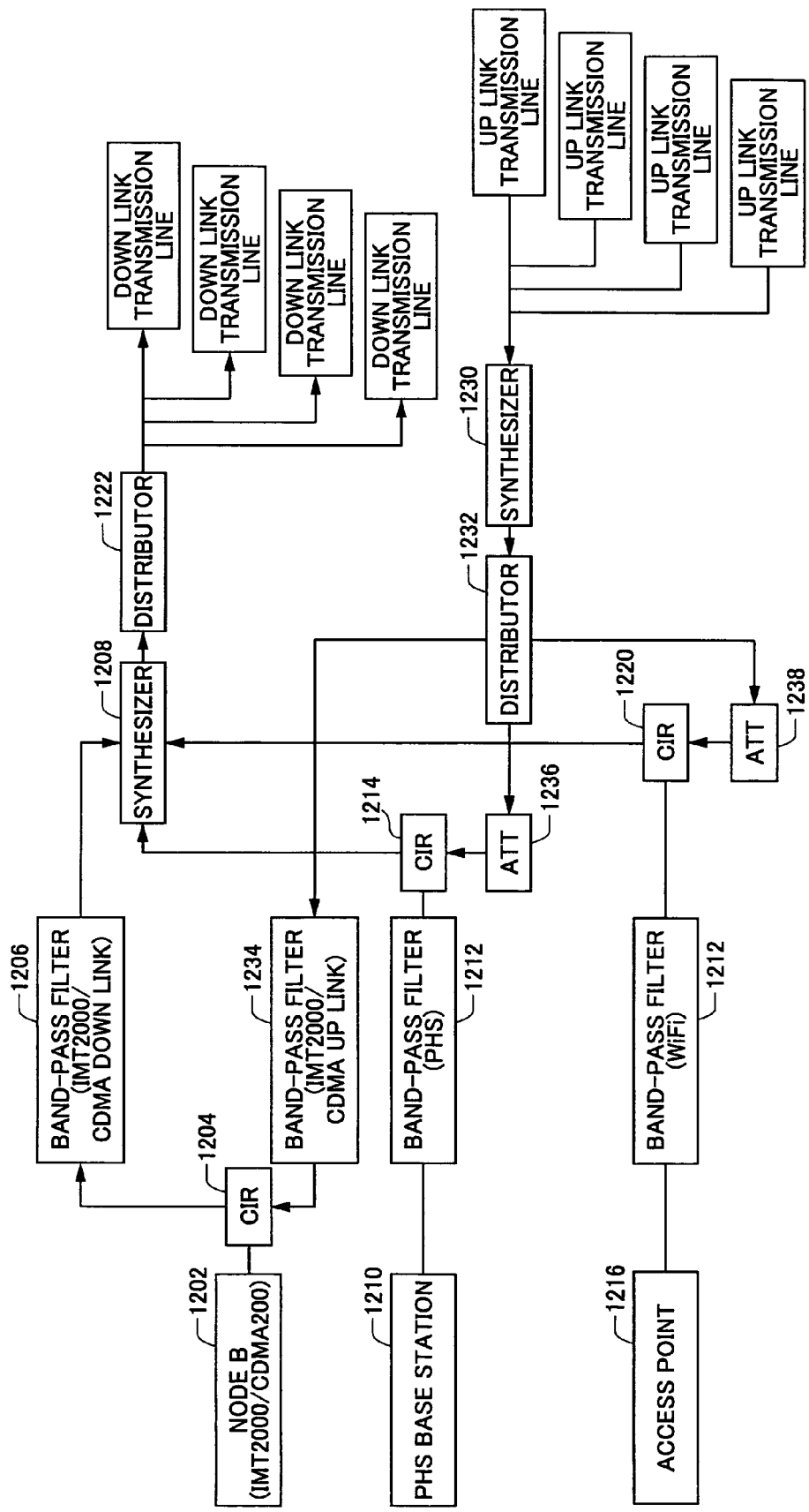
FIG. 12 is a block diagram (1) showing the signal transmission system of FIG. 11 in detail.
Figure 13:
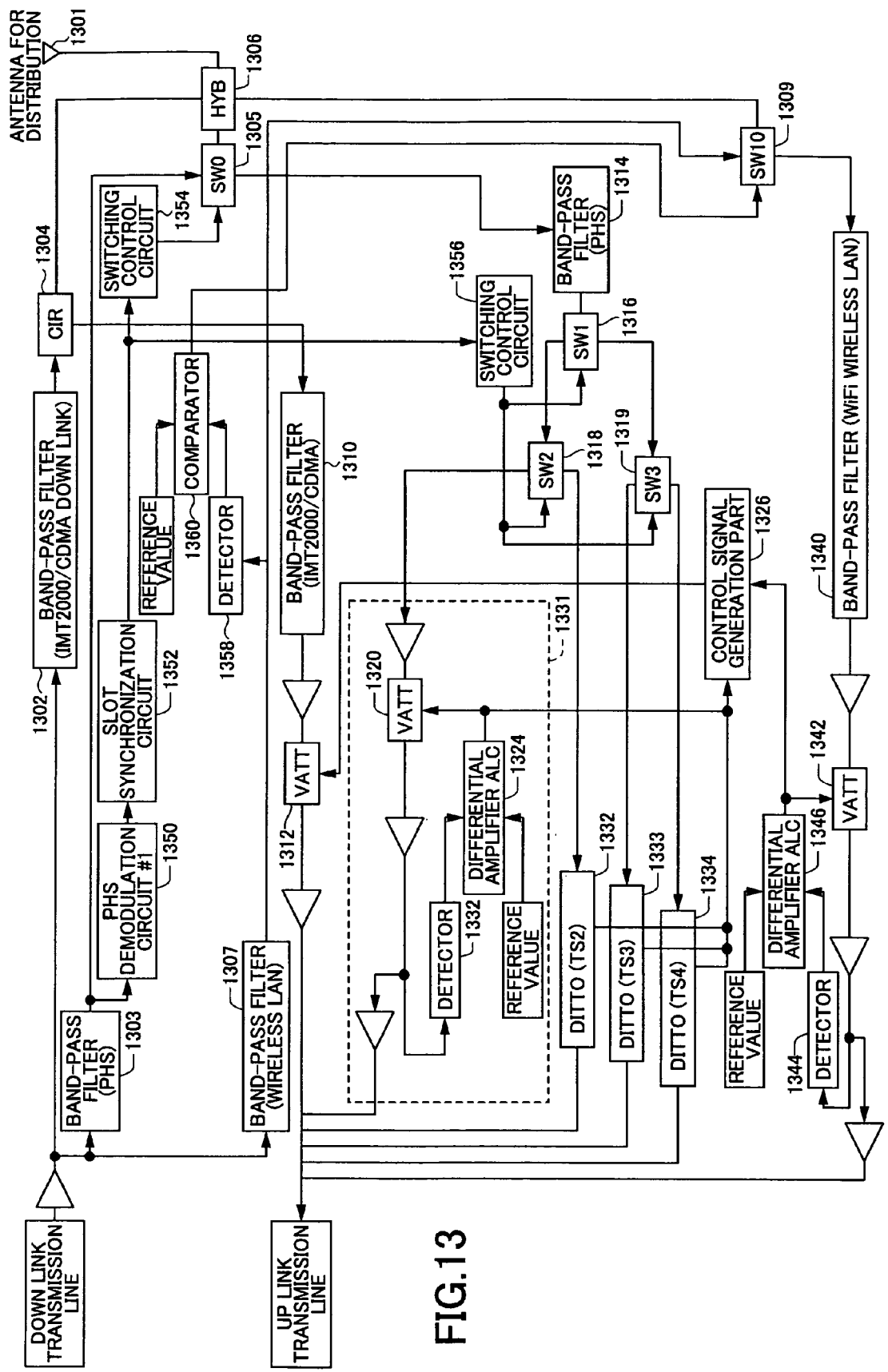
FIG. 13 is a block diagram (2) showing the signal transmission system of FIG. 11 in detail.

FIGS. 12 and 13 are functional block diagrams showing the signal transmission system of FIG. 11 in more detail. In FIG. 12, a DOWN LINK signal transmitted from a radio base station (node B) 1202 of the radio communication system of the W-CDMA scheme is supplied, via the circulator 1204, to a band-pass filter 1206 that passes a band for W-CDMA, and the signal is supplied to the synthesizer 1208. A DOWN LINK signal transmitted from a radio base station 1210 of PHS is supplied to the synthesizer 1208 viv a band-pass filter 1212 for PHS and a circulator 1214. A DOWN LINK signal from an access point (WiFi apparatus, for example) for wireless LAN is supplied to the synthesizer 1208 via a band-pass filter 1218 for wireless LAN and the circulator 1220. DOWN LINK signals of each radio communication system are synthesized by the synthesizer 1208, and are distributed to plural DOWN LINK transmission lines by the distributor 1222. Each of the transmission lines corresponds to a cell, and is used for transmitting a DOWN LINK signal to a mobile terminal in the cell. In the cell, mobile terminals of W-CDMA, wireless LAN, and PHS may reside.

The UP LINK signals from the mobile terminals in the cells are obtained from the UP LINK transmission lines for each cell. The UP LINK signals are synthesized by the synthesizer 1230, and the distributor 1232 distributes the signals for each radio communication system. One of the distributed UP LINK signals is transmitted to the radio base station 1202 via a band-pass filter 1234 and the circulator 1204. One of the UP LINK signals distributed by the distributor 1232 is attenuated in an attenuator (ATT) 1236, and is transmitted to the radio base station 1210 of PHS via the circulator and the band-pass filter 1212. Another one of the UP LINK signals distributed by the distributor 1232 is attenuated in an attenuator (ATT) 1238, and is transmitted to the access point 1216 for wireless LAN via a circulator 1220 and the band-pass filter 1218.

FIG. 13 shows process components on one of the four DOWN LINK transmission lines and one of the four UP LINK transmission lines shown in FIG. 12. A DOWN LINK signal distributed from the distributor 1222 shown in FIG. 12 is transmitted from an antenna 1301 via a band-pass filter 1302 for W-CDMA, a circulator 1304 and a hybrid part (HYB) 1306. The DOWN LINK signal is also supplied to a band-pass filter 1303 for PHS, and the output is transmitted from the antenna 1301 via a switch 1305 (SWO) and the hybrid part (HYB) 1306. Further, the DOWN LINK signal is also supplied to a band-pass filter 1307 for wireless LAN, and the output is also transmitted from the antenna 1301 via a switch 1309 (SW10) and the hybrid part (HYB) 1306.

An UP LINK signal received by the antenna 1301 from the mobile terminal is supplied to a band-pass filter 1310 for W-CDMA via the hybrid part 1306 (HYB) and the circulator 1304, and the output is transmitted to the synthesizer 1230 shown in FIG. 12 via a variable attenuator 1312 (VATT). FIG. 13 shows amplifiers indicated by triangle marks before and after the variable attenuator and in other positions. But, the amplifiers are not essential in this embodiment and the description is not presented. The UP LINK signal is also supplied to a band-pass filter 1314 for PHS via the hybrid part 1306 (HYB) and the switch 1305, and the output is transmitted to the synthesizer 1230 shown in FIG. 12 via a switch 1316 (SW1), a switch 1318 (SW2) and a signal processing part 1331. In addition, the UP LINK signal is supplied to a band-pass filter 1340 for wireless LAN via the hybrid part 1306 (HYB) and the switch 1309 (SW10), and the output is transmitted to the synthesizer 1230 shown in FIG. 12 via a variable attenuator 1342 (VATT).

The UP LINK signal of PHS output from the variable attenuator 1320 (VATT) is detected by a detector 1322. The detected result is compared with a reference value by a differential amplifier 1324. The compared result is supplied to a control signal generation part 1326. The same processing is performed in each of the signal processing parts 1332, 1333 and 1334, and each comparison result is also supplied to the control signal generation part 1326. The output level of the variable attenuator 1320 is determined based on the comparison result from the differential amplifier 1324. When the comparison result indicates that an UP LINK signal of PHS exceeding the permissible level exists, the UP LINK signal of PHS is attenuated in the variable attenuator 1320 since the UP LINK signal of PHS causes a spurious signal for communications of W-CDMA.

The UP LINK signal for wireless LAN output from the variable attenuator 1342 (VATT) is detected by the detector 1344. The compared result is supplied to the control signal generation part 1326. When the comparison result indicates that an UP LINK signal of wireless LAN exceeding the permissible level exists, the UP LINK signal of wireless LAN is attenuated in the variable attenuator 1342 since the UP LINK signal causes a spurious signal for communications of W-CDMA.

The control signal generation part 1326 generates the control signal for determining an attenuation amount in the variable attenuator 1312 based on a largest one in various spurious signals (signals other than W-CDMA) included in the UP LINK signal obtained by the antenna 1301. When the spurious signal exists, the UP LINK signal of the W-CDMA scheme is attenuated in the variable attenuator 1312. Therefore, when an UP LINK signal component other than the W-CDMA scheme exists exceeding the permissible level, the UP LINK signal is attenuated by the variable attenuators 1312 and 1320 (and/or 1342).

By the way, in the communication system of PHS, a Time Division Duplex (TDD) scheme or a full-duplex scheme is adopted, transmit/receive switching needs to be properly controlled such that each of the signal processing parts 1331~1334 operates at UP LINK intervals according to corresponding time slots. The switching is performed by a switching control circuit 1354 and the switch 1305 (SWO), and the timing of switching is detected by a PHS demodulation circuit 1350 and a slot synchronization circuit 1352. The switching is described in more detail in an after-mentioned embodiment. In addition, transmit/receive switching in the wireless LAN scheme is performed by a CSMA/CA (Carrier Sense Multiple Access with Collision Avoidance) scheme in the switch 1309 (SW10). The switching timing occurs at irregular intervals. The detector 1358 detects the signal level of wireless LAN so that the comparator 1360 compares the detection result with a reference value to detect the switching timing.

Fourth Embodiment

Figure 14:
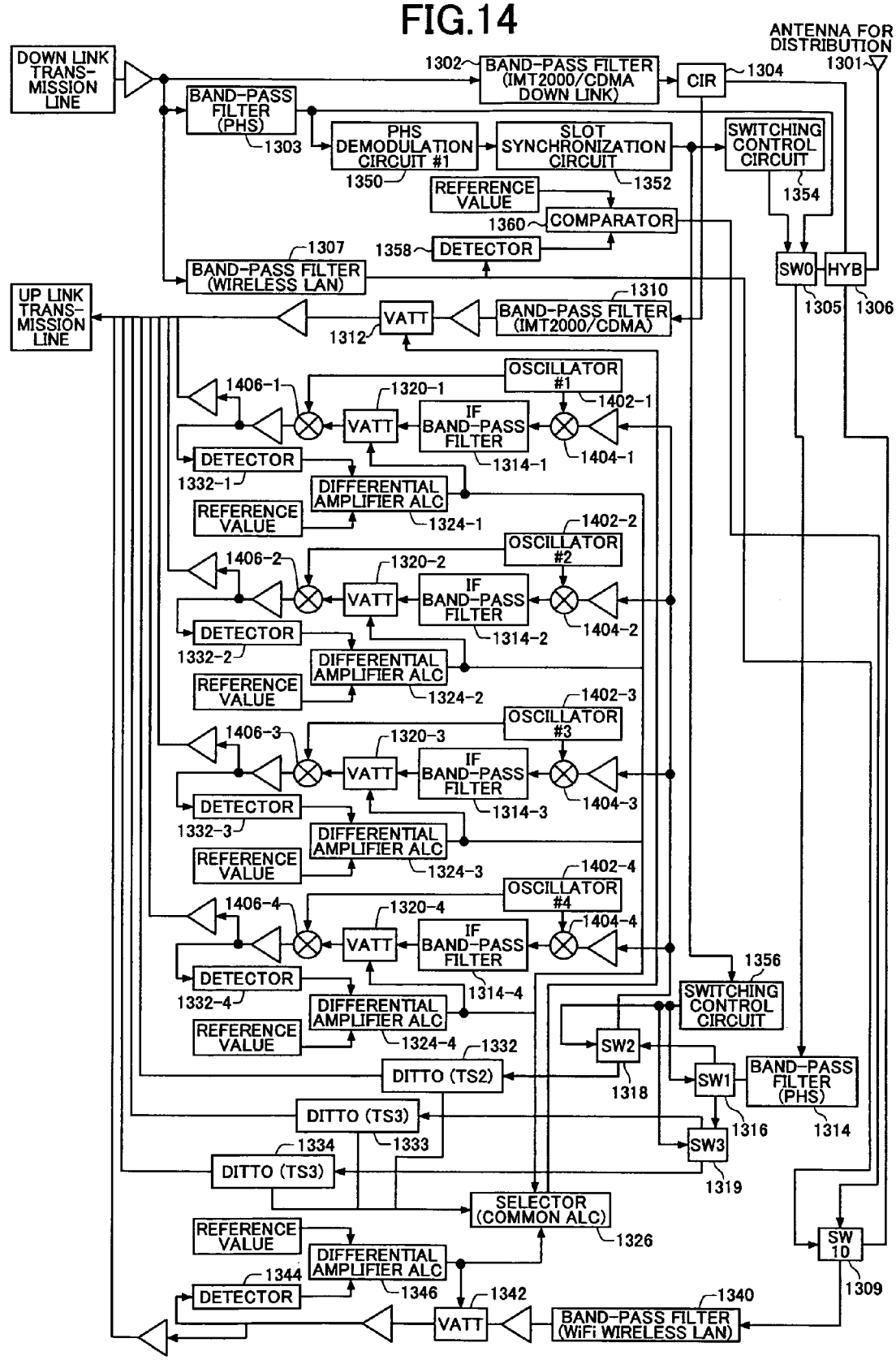
FIG. 14 is a block diagram showing a signal transmission system according to an embodiment of the present invention.

In the example of FIG. 13, configuration as to the frequency of the UP LINK signal of PHS from the switch 1318 is simplified in FIG. 13. That is, FIG. 13 shows the configuration such that all signals from the switch 1318 are processed by the same frequency. In the example shown in FIG. 14, the frequency of one of four UP LINK signals for PHS from the switch 1318 is converted to a first frequency by an oscillator 1402-1 and a mixer 1404-1. After that, the UP LINK signal is supplied to a variable attenuator 1320-1, and a frequency of the output of the variable attenuator 1320-1 is returned to the original frequency by a mixer 1406-1. The frequency of another one of four UP LINK signals for PHS from the switch 1318 is converted to a second frequency by an oscillator 1402-2 and a mixer 1404-2. After that, the UP LINK signal is supplied to a variable attenuator 1320-2, and a frequency of the output of the variable attenuator 1320-2 is returned to the original frequency by a mixer 1406-2. The frequency of still another one of four UP LINK signals for PHS from the switch 1318 is converted to a third frequency by an oscillator 1402-3 and a mixer 1404-3. After that, the UP LINK signal is supplied to a variable attenuator 1320-3, and a frequency of the output of the variable attenuator 1320-3 is returned to the original frequency by a mixer 1406-3. The frequency of still another one of four UP LINK signals for PHS from the switch 1318 is converted to a second frequency by an oscillator 1402-4 and a mixer 1404-4. After that, the UP LINK signal is supplied to a variable attenuator 1320-4, and a frequency of the output of the variable attenuator 1320-4 is returned to the original frequency by a mixer 1406-4. Processes performed after the above-mentioned processes are the same as those described with reference to FIG. 13. As mentioned above, the processes such as detection and reduction of the spurious signal can be performed for each frequency channel.

Fifth Embodiment

Figure 15:
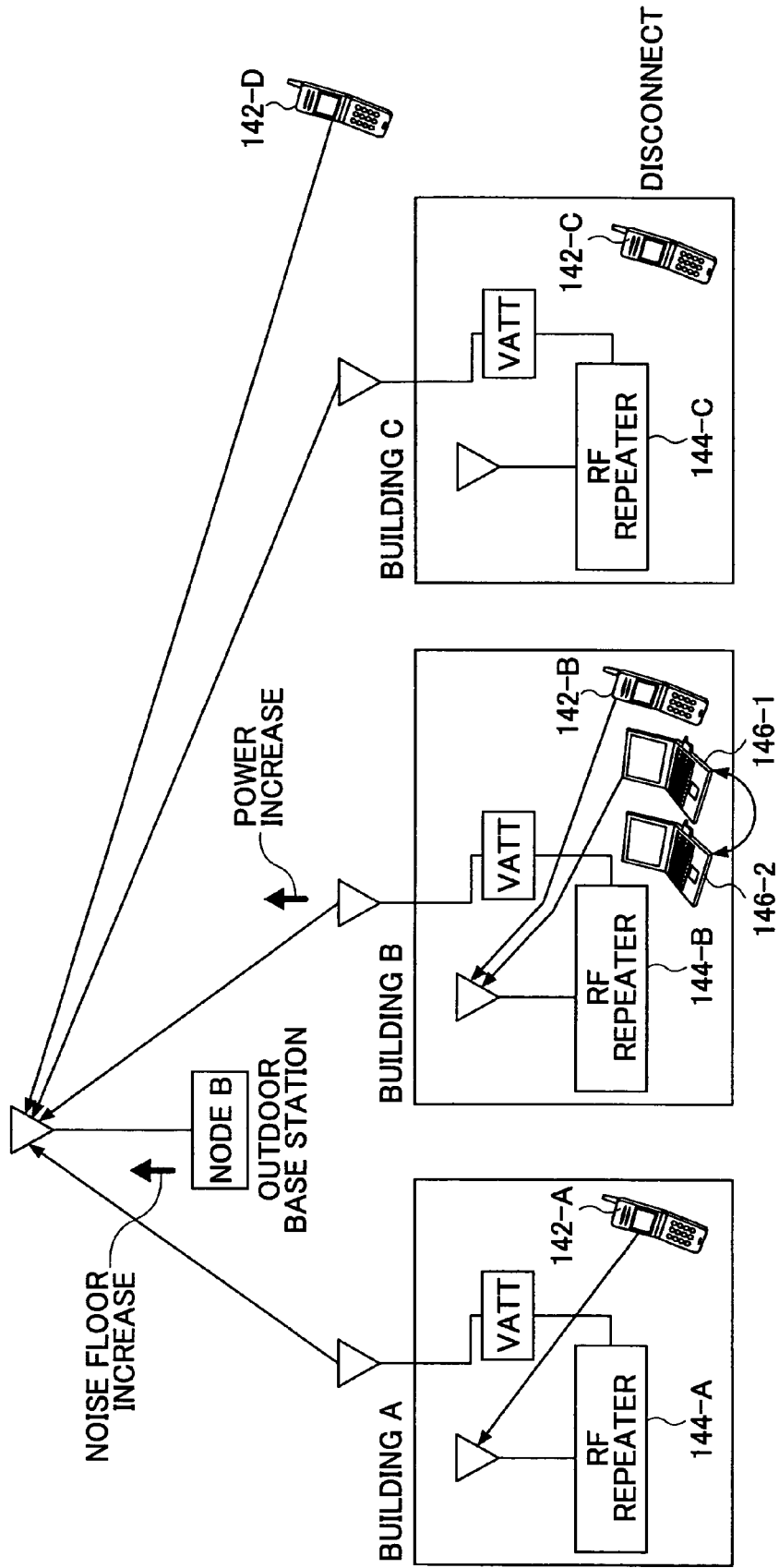
FIG. 15 is a block diagram showing a signal transmission system according to an embodiment of the present invention.

FIG. 15 shows a signal transmission system according to an embodiment of the present invention. In this embodiment, plural buildings A, B and C exist under the radio base station (node B) of the radio communication system for W-CDMA. Each of the mobile terminals 142-A, B and C performs radio communications with the node B via a corresponding one of Radio Frequency repeaters 144-A, B and C in the buildings. A mobile terminal 142-D directly performs radio communications with the node B. Each inside space of the buildings A, B and C can be considered as the indoor closed space described in the before-described embodiments.

Assuming that mobile terminals 146-1 and 2 communicating under the wireless LAN scheme appear near the mobile terminal 142-B that is performing radio communications in the building B. When radio waves emitted by the mobile terminals 146-1 and 2 are received by the Radio Frequency repeater 144-B, the radio waves causes a spurious signal for the UP LINK signal from the mobile terminal 142-B. As a result, an UP LINK signal including the spurious signal or an interference signal is transmitted from the Radio Frequency repeater 144-B to the node B. The node B or the upper apparatus controls the mobile terminal 142-B such that it transmits a signal with an increased power in order to improve the signal quality for the mobile terminal 142-B. As a result, a noise level that is a reference in node B increases so that communications are affected not only in the building B but also in other areas. For example, communication is interrupted, communication capacity is decreased, communication quality deteriorates, consumed power increases, and the like. In this embodiment, such disadvantage is avoided by realizing the signal transmission system of the present invention by using the Radio Frequency repeater.

Figure 16:
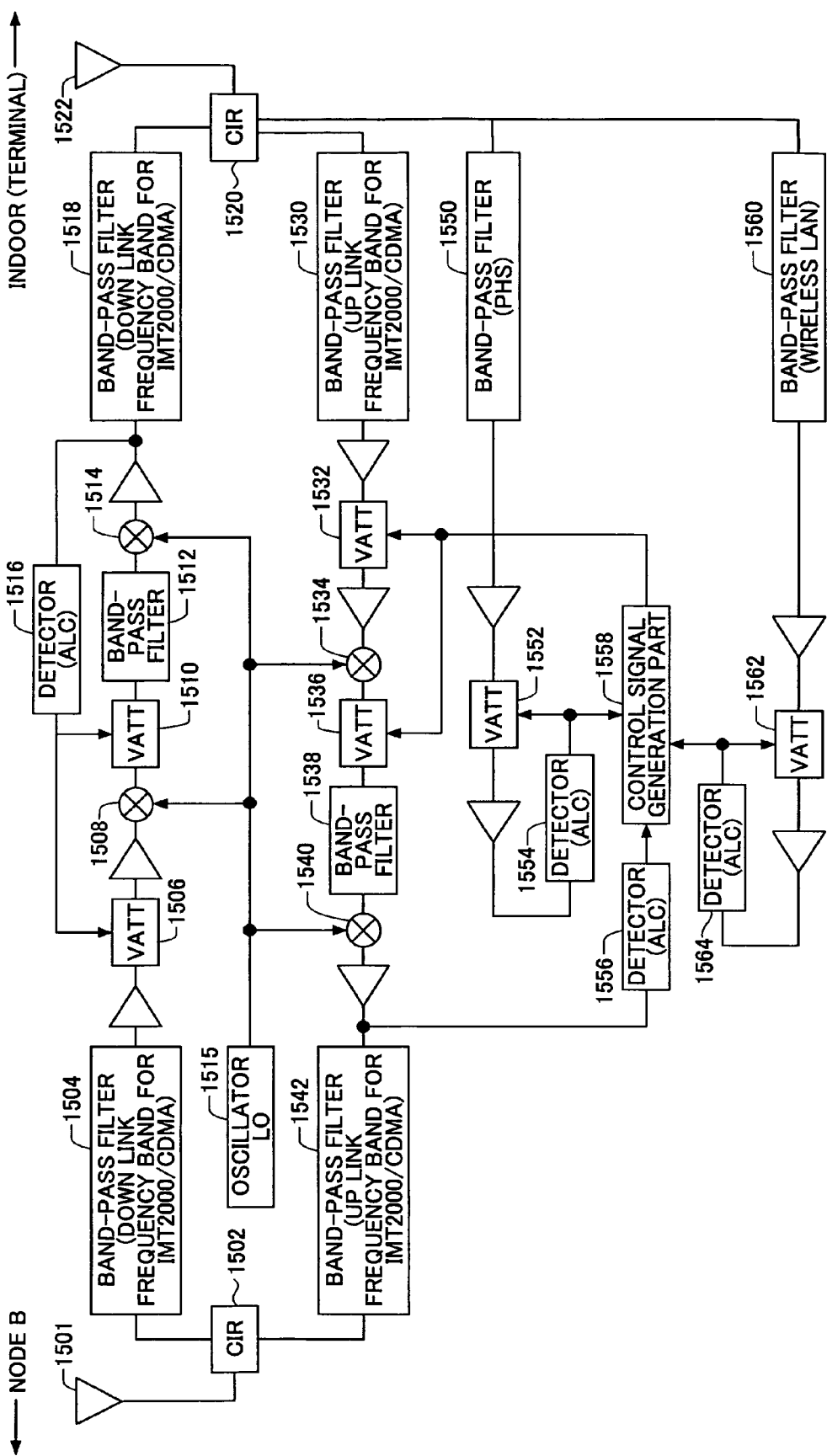
FIG. 16 is a block diagram of a radio frequency repeater equipment including the signal transmission system of an embodiment of the present invention.

FIG. 16 is a block diagram of a Radio Frequency repeater including a transmission system of the present embodiment. This Radio Frequency repeater can be used as each of the Radio Frequency repeateres 144-A, B and C shown in FIG. 15. A DOWN LINK signal from the radio base station (node B) is received by an antenna 1501, and is supplied to a band-pass filter 1504 for W-CDMA via a circulator 1502. The output is attenuated by the variable attenuators 1506 and 1510. Then, the signal is transmitted from the antenna 1522 via a band-pass filter 1518 and a circulator 1520, so that the signal reaches mobile terminals under the Radio Frequency repeater. An output from the band-pass filter 1504 is attenuated in the passed band and a frequency-converted band by a local oscillator 1515 and mixers 1508 and 1514. An UP LINK signal from a mobile terminal under the Radio Frequency repeater is received by the antenna 1522, and is supplied to a band-pass filter 1530 for W-CDMA via the circulator 1520. The output is attenuated by variable attenuators 1532 and 1536, and is output from an antenna 1501 via a band-pass filter 1542 and the circulator 1502, so that the signal is transmitted to the radio base station. These features are also included in a conventional Radio Frequency repeater.

In the Radio Frequency repeater of the present embodiment, the UP LINK signal received by the antenna 1522 is also supplied to a band-pass filter 1550 for PHS, and the output is attenuated by a variable attenuator 1552 (VATT), so that the attenuated signal is detected by the detector 1554. The detection result is supplied to a control signal generation part 1558. In addition, the UP LINK signal received by the antenna 1522 is also supplied to a band-pass filter 1560 for wireless LAN, and the output is attenuated by a variable attenuator 1562 (VATT), so that the attenuated signal is detected by the detector 1564. The detection result is supplied to the control signal generation part 1558. Further, a signal to be input to the band-pass filter 1542 is also supplied to a detector 1556, and the detection result of the detector 1556 is also supplied to the control signal generation part 1558. The control signal generation part 1558 determines whether a spurious signal (signal for PHS or signal for wireless LAN) included in the UP LINK signal for W-CDMA exceeds the permissible level based on the supplied detection result. Then, the control signal generation part 1558 determines information of the control signal to be supplied to the variable attenuators 1532 and 1536 based on the determination result. When the spurious signal exceeds the permissible level, the control signal is generated such that the UP LINK signal is largely attenuated. When the spurious signal does not exceed the permissible level, the control signal is generated such that the UP LINK signal is not so largely attenuated. Although the control signal is generated based on larger one of the signals for PHS and wireless LAN, the control signal may be generated based on both of the signals.

Sixth Embodiment

Figure 17:
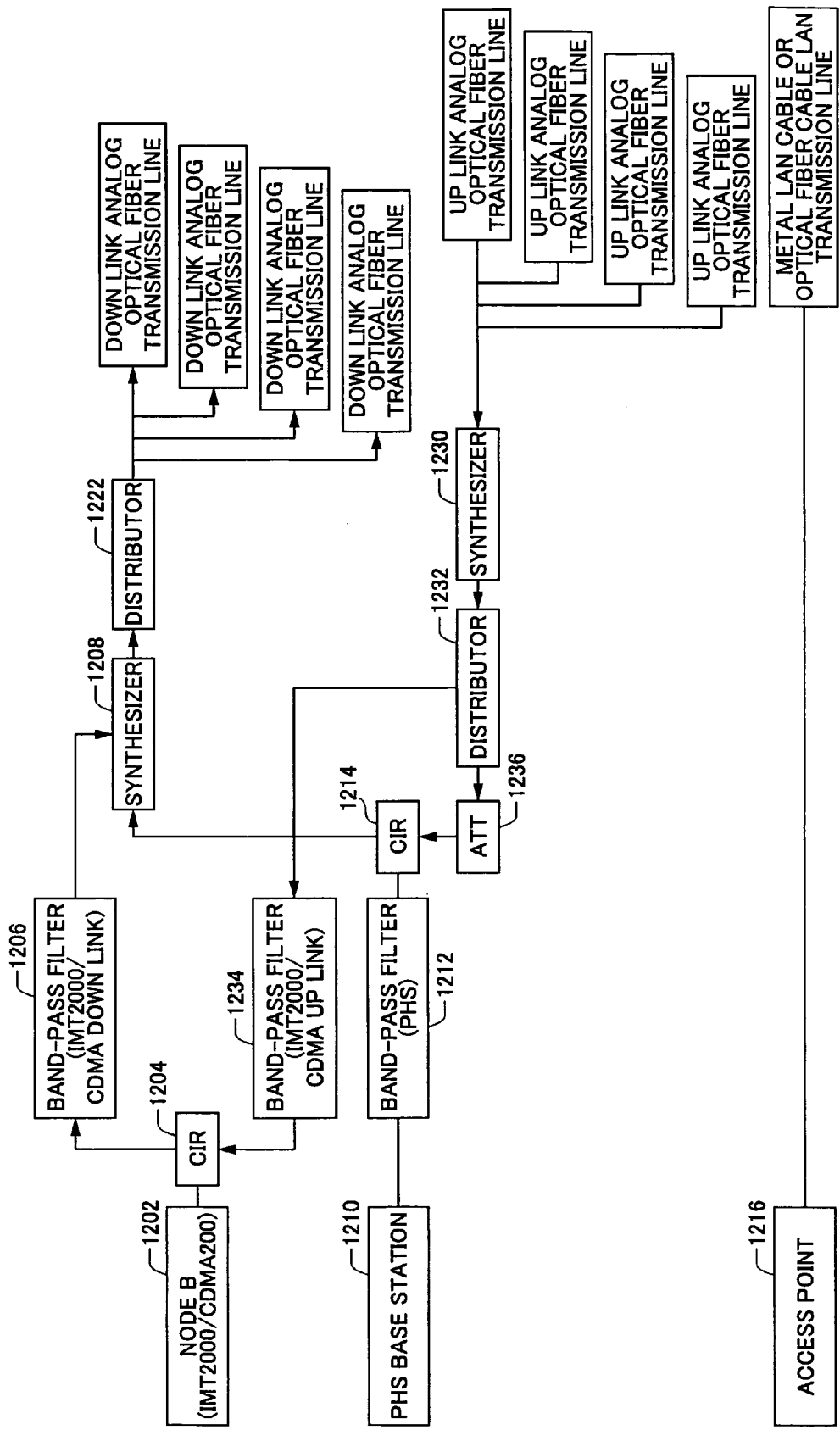
FIG. 17 is a block diagram (1) showing a signal transmission system of an embodiment of the present invention.
Figure 18:
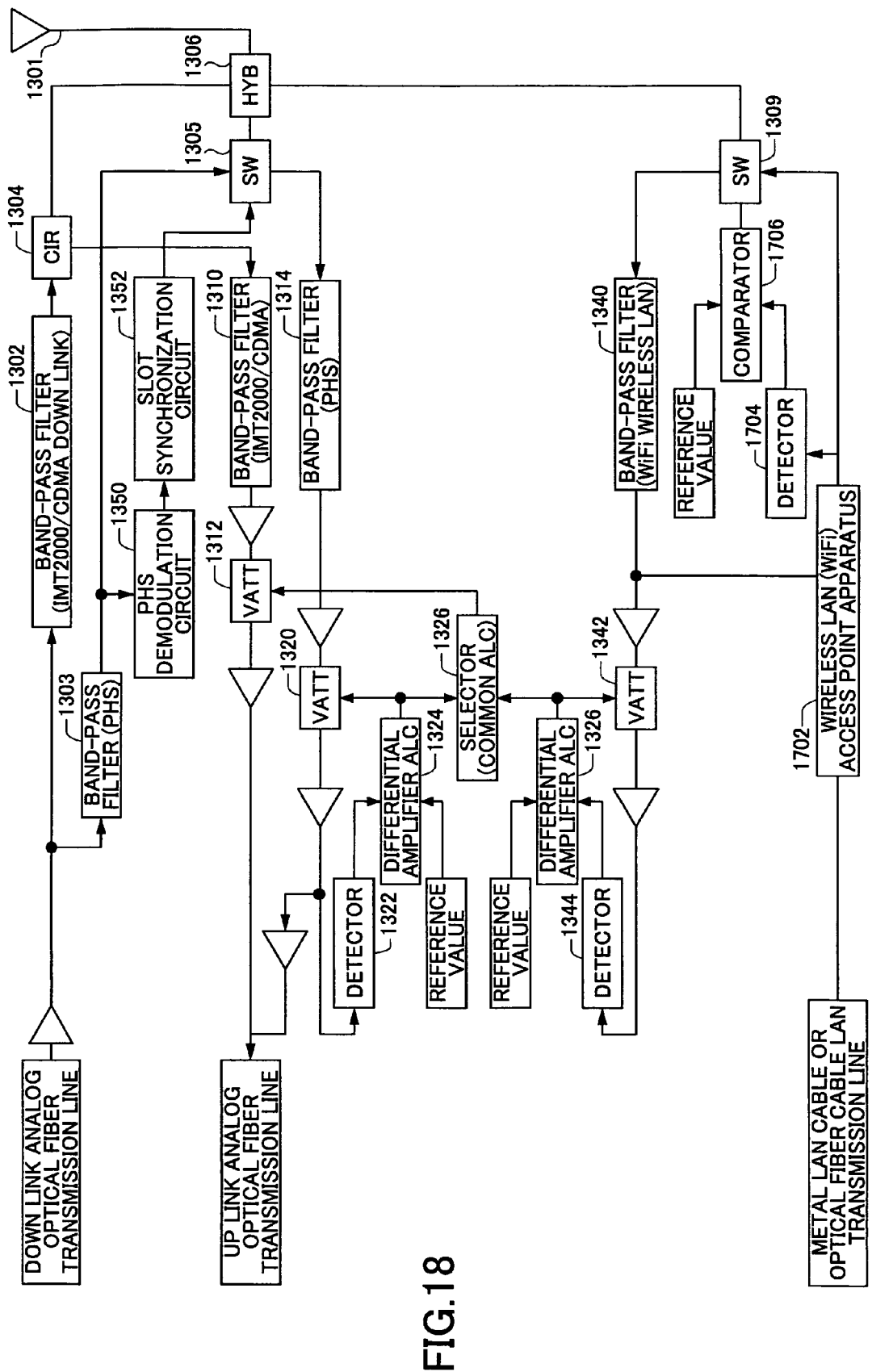
FIG. 18 is a block diagram (2) showing a signal transmission system of an embodiment of the present invention.

FIGS. 17 and 18 are functional block diagrams showing the signal transmission system according to an embodiment of the present invention. In the figures, the same numerals are used to identify corresponding features in FIGS. 12 and 13. A DOWN LINK signal transmitted from the radio base station (node B) 1202 of the radio communication system of the W-CDMA scheme is supplied to the band-pass filter 1206 that passes a band for W-CDMA via the circulator 1204, and the signal is supplied to the synthesizer 1208. A DOWN LINK signal from a radio base station 1210 of PHS is supplied to the synthesizer 1208 via the band-pass filter 1212 for PHS and the circulator 1214.

Different from the example shown in FIG. 12, a DOWN LINK signal from the access point 1216 for wireless LAN or from a router for LAN is transmitted, separately from signals for W-CDMA and PHS, via a transmission media for wireless LAN. The transmission media is a metal LAN cable such as a coaxial cable, an optical fiber cable and the like, for example.

DOWN LINK signals of the radio communication systems for W-CDMA and PHS are synthesized by the synthesizer 1208, and are distributed to plural DOWN LINK transmission lines by the distributor 1222. Each of the transmission lines corresponds to a cell, and is used for transmitting a DOWN LINK signal to a mobile terminal in the cell. In the cell, mobile terminals of W-CDMA, wireless LAN, and PHS may reside.

UP LINK signals from the mobile terminals in the cells are obtained from the UP LINK transmission lines for each cell. The UP LINK signals are synthesized by the synthesizer 1230, and the distributor 1232 distributes the signals to each radio communication system. One of the distributed UP LINK signals is transmitted to the radio base station 1202 via the band-pass filter 1234 and the circulator 1204. One of the UP LINK signals distributed by the distributor 1232 is attenuated in the attenuator (ATT) 1236, and is transmitted to the radio base station 1210 of PHS via the circulator 1214 and the band-pass filter 1212.

Different from other signals, the UP LINK signal for wireless LAN is transmitted to the access point 1216 for wireless LAN separately from other UP LINK signals.

FIG. 18 shows process components on one of the four DOWN LINK transmission lines, one of the four UP LINK transmission lines, and a transmission line for wireless LAN shown in FIG. 17. In FIG. 17, the same reference numerals are used to identify corresponding features in FIG. 13. A DOWN LINK signal distributed from the distributor 1222 shown in FIG. 17 is transmitted from the antenna 1301 via the band-pass filter 1302 for W-CDMA, the circulator 1304 and the hybrid part (HYB) 1306. The DOWN LINK signal is also supplied to the band-pass filter 1303 for PHS, and the output is transmitted from the antenna 1301 via the switch 1305 (SWO) and the hybrid part (HYB) 1306.

A DOWN LINK signal for wireless LAN is supplied to an access point 1702 for wireless LAN, and after performing processes such as conversion of signal form, the signal is transmitted from the antenna 1301 via the switch 1309 and the hybrid part (HYB) 1306.

An UP LINK signal received by the antenna 1301 from the mobile terminal is supplied to a band-pass filter 1310 for W-CDMA via the hybrid part 1306 (HYB) and the circulator 1304, and the output is transmitted to the synthesizer 1230 shown in FIG. 17 via the variable attenuator 1312 (VATT). On the other hand, the UP LINK signal is supplied to the band-pass filter 1314 for PHS via the hybrid part 1306 (HYB) and the switch 1305, and the output is transmitted to the synthesizer 1230 shown in FIG. 17 via the variable attenuator 1320 (VATT).

Further, the UP LINK signal from the antenna 1301 is supplied to the band-pass filter 1340 for wireless LAN via the hybrid part 1306 (HYB) and the switch 1309, and the output is transmitted to another access point 1216 shown in FIG. 17 via the access point 1702 and a transmission medium.

The UP LINK signal of PHS output from the variable attenuator 1320 (VATT) is detected by the detector 1322. The detected result is compared with a reference value by the differential amplifier 1324. The compared result is supplied to the control signal generation part 1326. The output level of the variable attenuator 1320 is determined based on the comparison result from the differential amplifier 1324. When the comparison result indicates that an UP LINK signal of PHS exceeding the permissible level exists, the UP LINK signal is attenuated in the variable attenuator 1320 since the UP LINK signal causes a spurious signal.

The UP LINK signal for wireless LAN output from the variable attenuator 1342 (VATT) is detected by the detector 1344. The detected result is compared with a reference value by the differential amplifier 1346. The compared result is supplied to the control signal generation part 1326. When the comparison result indicates that an UP LINK signal of wireless LAN exceeding the permissible level exists, the UP LINK signal is attenuated since the UP LINK signal causes a spurious signal.

The control signal generation part 1326 generates the control signal for determining an attenuation amount in the variable attenuator 1312 based on a largest one in various spurious signals (signals other than the W-CDMA scheme) included in the UP LINK signal obtained by the antenna 1301. When the spurious signal exists, the UP LINK signal is attenuated in the variable attenuators 1312 and (1320 and/or 1342).

By the way, in the communication system of PHS, a Time Division Duplex (TDD) scheme is adopted. Thus, it is necessary that switching between UP LINK/DOWN LINK lines is properly controlled. The switching is performed by the switch 1305. The timing of switching is detected by the PHS demodulation circuit 1350 and the slot synchronization circuit 1352. The switching is described in detail in an aftermentioned embodiment. In addition, switching between transmit and receive in the wireless LAN scheme is performed by the switch 1309. The detector 1704 detects the signal level of wireless LAN so that the comparator 1706 compares the detection result with a reference value to detect the switching timing.

Figure 19:
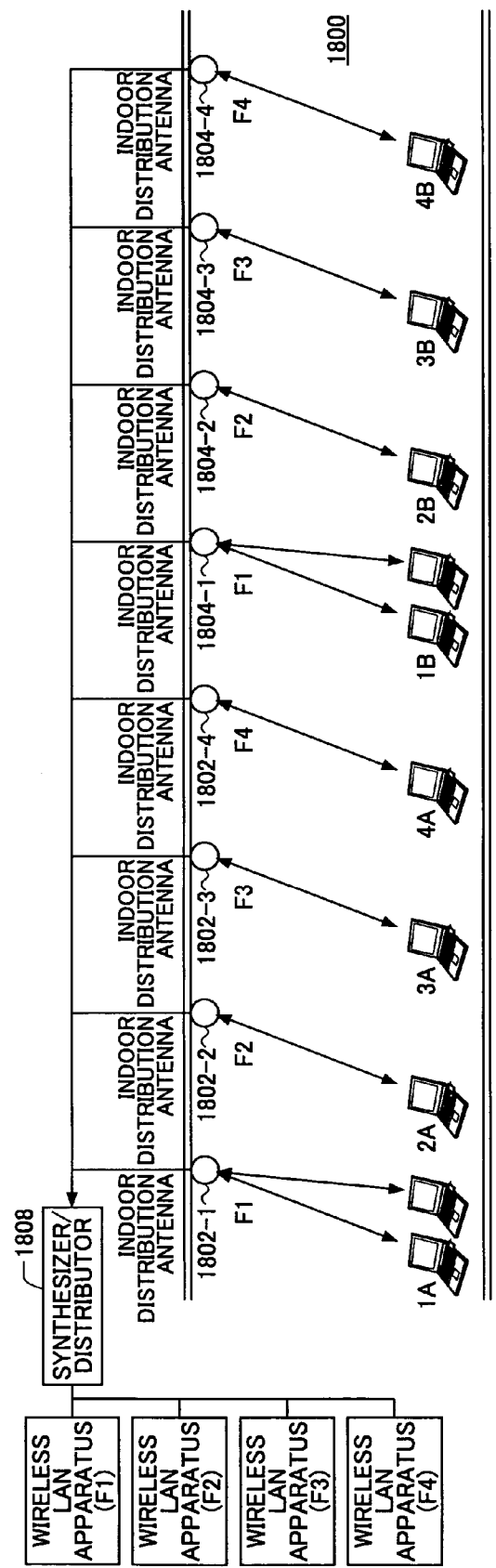
FIG. 19 is a diagram for describing a signal transmission system according to an embodiment of the present invention.
Figure 20:
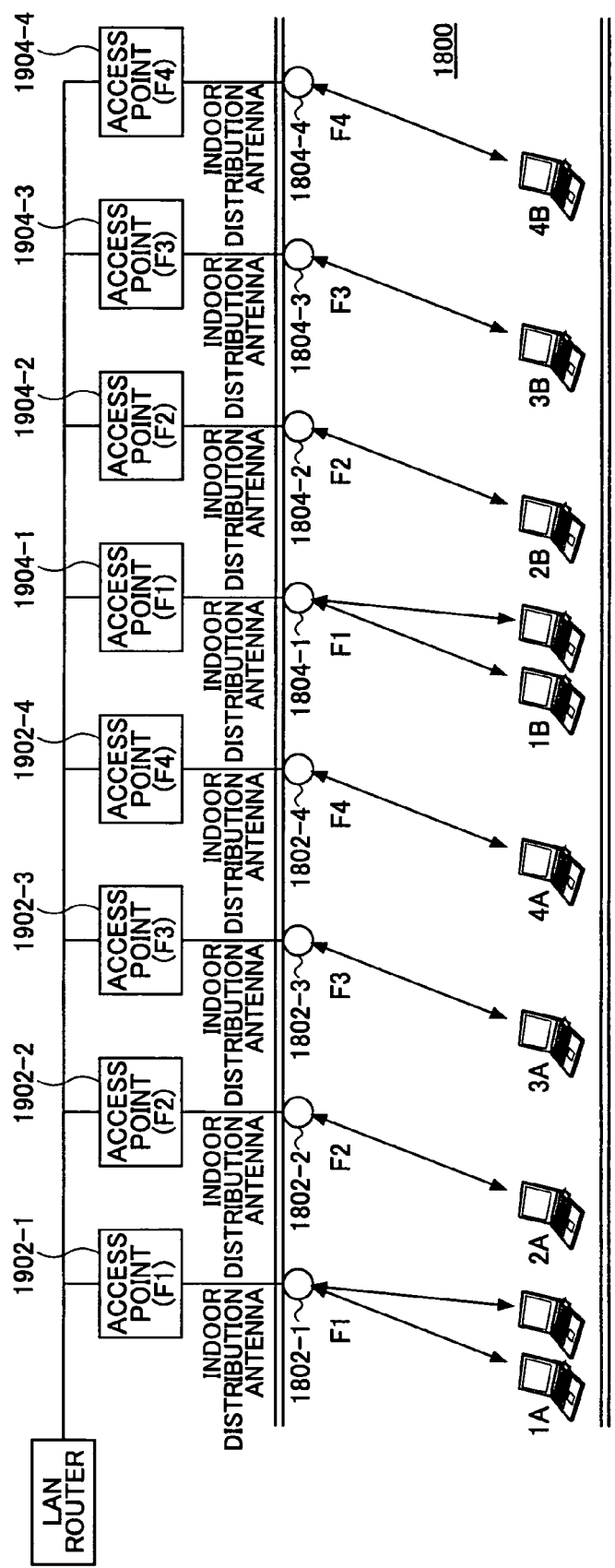
FIG. 20 is a diagram for describing a signal transmission system according to an embodiment of the present invention.

FIG. 19 shows a signal transmission system like the signal transmission system shown in FIGS. 12 and 13, and FIG. 20 shows a signal transmission system according to the present embodiment. As shown in FIG. 19, antennas 1802-1~4 and 1804-1~4 that are shared for plural radio communication systems are provided in an indoor closed space 1800, in which one antenna corresponds to one cell. DOWN LINK signals to be sent to each antenna are distributed by the distributor/synthesizer 1808, and UP LINK signals from each antenna are synthesized by the distributor/synthesizer 1808. The distributor/synthesizer 1808 corresponds to the distributor 1222 and the synthesizer 1230 in FIG. 12. Also in this example, although radio communication systems for W-CDMA, PHS and wireless LAN exist, components for W-CDMA and PHS are not shown in the figure. It is assumed that a region of the antennas 1802-1~4 is apart from a region of the antennas 1804-1~4 such that interference is not caused with each other. In the example shown in the figure, four frequency channels F1~F4 are used in each of the two region.

Under the antenna 1802-1, two mobile terminals for wireless LAN indicated as 1A are shown. Each of the mobile terminals uses the frequency channel F1 by time-division, and communicates with a corresponding communication partner via a wireless LAN apparatus (F1) shown in the figure. Under the antenna 1802-2, a mobile terminal for wireless LAN indicated as 2A is shown. The mobile terminal uses the frequency channel F2, and communicates with a corresponding communication partner via a wireless LAN apparatus (F2) shown in the figure. In the same way, a mobile terminal 3A communicates with a corresponding communication partner via a wireless LAN apparatus (F3), and a mobile terminal 4A communicates with a corresponding communication partner via a wireless LAN apparatus (F4). Each of the mobile terminals 1B~4B in the region of the antennas 1804-1~4 performs communications in the same way.

As to communications using the frequency channel F1, although the antenna 1802-1 and the antenna 1804-1 are geographically apart from each other such that interference does not occur, mobile terminals under the antenna 1802-1 and the antenna 1804-1 cannot used the frequency channel F1 at the same time since signals from/to the antennas are distributed/synthesized by the distributor/synthesizer 1808. Thus, the frequency channel F1 need to be used by time-division. In other wards, the mobile terminals 1A and 1B are under the same CSMA/CS control. In addition, two terminals 1A need to use the frequency channel F1 by time-division, and two terminals 1B need to use the frequency channel F1 by time-division. Therefore, the frequency channel F1 needs to be used by time-division among the four mobile terminals. Therefore, this method is not necessarily advantageous from the viewpoint of increasing speed of data transmission and the like.

Different from the system shown in FIG. 19, the system shown in FIG. 20 is provided with access points for wireless LAN for each antenna. Access points 1902-1~4 are provided for the antennas 1802-1~4, and access points 1904-1~4 are provided for the antennas 1804-1~4. The access point corresponds to the access point 1702 shown in FIG. 18. Each of the access points 1902-1 and 1904-1 communicates with a corresponding partner access point (corresponding to the access point 1216 in FIG. 17) independently with each other (without being synthesized). Therefore, the mobile terminals 1A can use the frequency channel F1 at the same time when the mobile terminals 1B uses the frequency channel F1. That is, the mobile terminals 1A are separated from the mobile terminals 1B as to CSMA/CA control. Thus, the two mobile terminals 1A can use the frequency channel F1 by time-division between the two mobile terminals, so that it is not necessary to consider the existence of the mobile terminals 1B. On the other hand, the mobile terminals 1B does not need to consider the existence of the mobile terminals 1A.

According to the present embodiment, a signal for wireless LAN is transmitted via a specific transmission medium without being synthesized with signals for W-CDMA and PHS in the synthesizer 1230 and without being distributed by the distributor 1222. In this case, the antenna 1301 is commonly used for the three radio communication systems. Therefore, according to the present embodiment, the data transmission speed can be increased and the communication capacity can be increased while one antenna is shared by plural radio communication systems.

Seventh Embodiment

Figure 21:
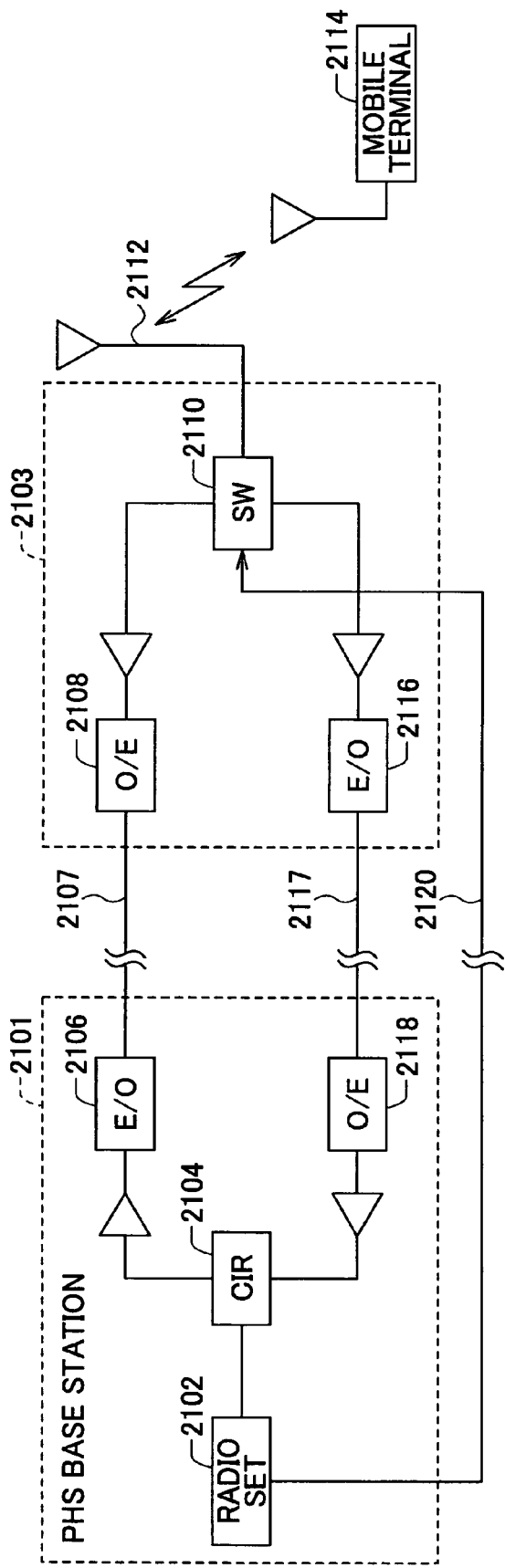
FIG. 21 is a block diagram of a conventional signal transmission system.

As mentioned above, in the communication system of PHS, since a Time Division Duplex (TDD) scheme or a full-duplex scheme is adopted, it is necessary that switching between UP LINK/DOWN LINK lines is properly controlled. For this purpose, in the conventional PHS, a configuration shown in FIG. 21 was adopted. FIG. 21 shows a radio base station 2101 for PHS, a signal transmission system 2103, and a mobile terminal 2114 of PHS. A DOWN LINK signal from a radio set 2102 in the radio base station 2101 is converted to an optical signal by an electrical-optical conversion part 2106 (E/O) via a circulator 2104. The converted optical signal is transmitted over an optical fiber 2107, and the signal is converted into an electrical signal by an optical-electrical conversion part 2108 (O/E). The converted signal reaches the mobile terminal 2114 via a switch 2110 and an antenna 2112. On the other hand, an UP LINK signal from the mobile terminal 2114 is supplied to an electric-optical conversion part 2116 (E/O) via the antenna 2112 and the switch 2110 so as to be converted to an optical signal. The converted signal is transmitted over an optical fiber 2117, and is converted to an electrical signal by an optical-electrical conversion part (O/E) 2118. The converted signal reaches the radio set 2102 via the circulator 2104. After that, the signal is transmitted to an upper apparatus (not in the figure).

In this case, switching between sending and receiving for the antenna 2112 is performed by the switch 2110, and the switching timing is determined based on a control signal transmitted from the radio set 2102 via a transmission medium 2120. However, there are disadvantages in this method in that (1) process work load for generating the proper control signal is not necessarily small, and (2) the transmission medium or a channel for transmitting the control signal needs to be provided. Therefore, it is inadvisable to adopt such a sending/receiving switching scheme to the signal transmission system of the present invention.

The method described in the following can effectively solve the disadvantages. In the following example, although PHS is taken as an example, the present invention can be applied not only to PHS but also to other radio communication systems using TDD.

Referring again to FIG. 13, in the signal transmission system according to an embodiment of the present invention, switching control for the switch 1305 is performed based on an DOWN LINK signal of PHS. A signal supplied to the band-pass filter 1303 for PHS is demodulated by the PHS demodulation circuit 1350. A slot synchronization circuit 1352 determines whether the demodulated signal includes a predetermined synchronization pattern. In response to the determination result, the switching timing for sending/receiving is determined by the switching control circuit 1354 so that the switch 1305 (SW0) is controlled.

Figure 22:
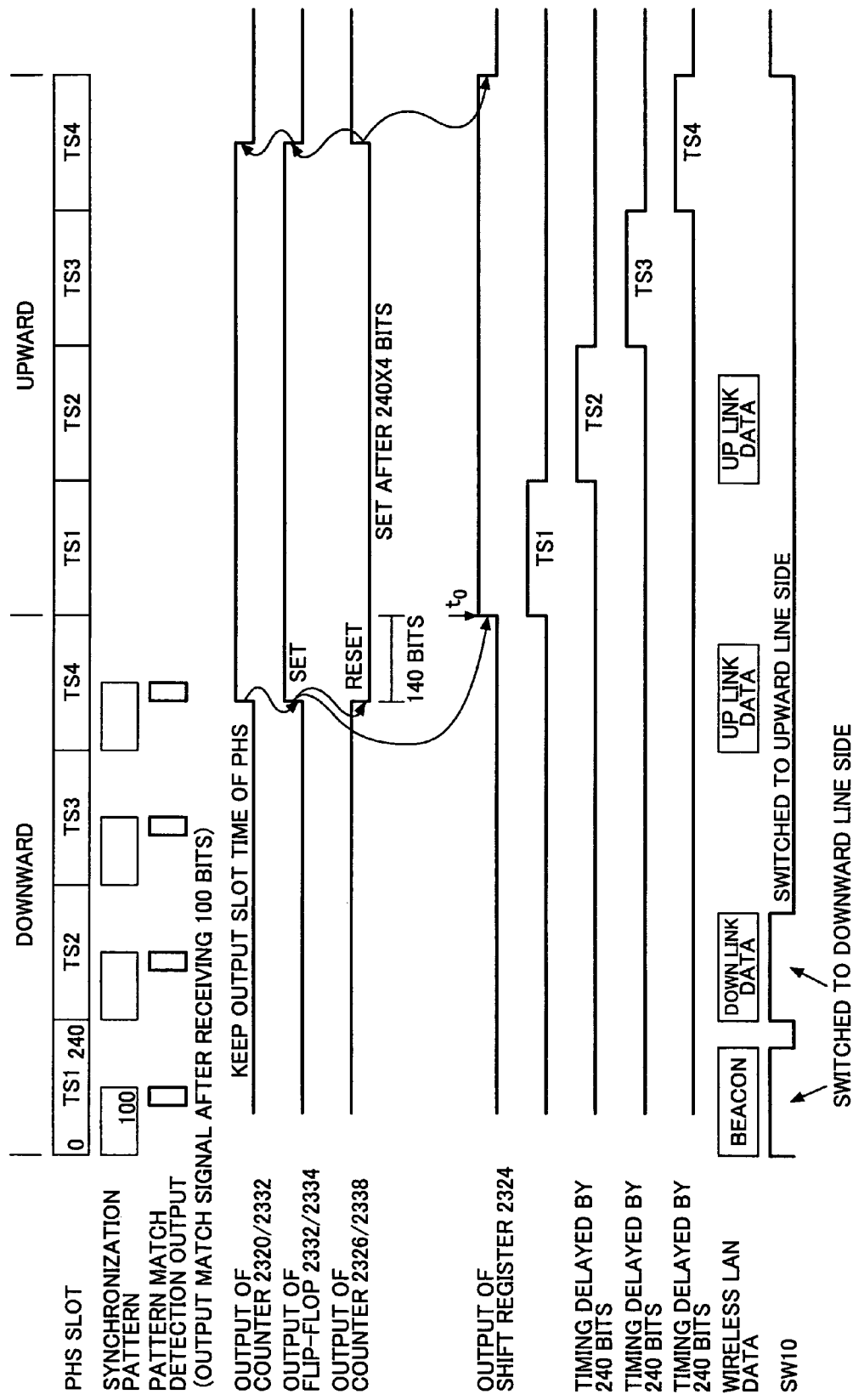
FIG. 22 shows a time slot format, and a timing charts showing signal waveforms of each process component.

FIG. 22 shows a time slot format and signal waveforms of each process component. As shown in the figure, four time slots TS1~TS4 are included in each of UP LINK and DOWN LINK lines. Signals for each process component is described later. FIG. 22 also shows switching operations of the switch 1309 (SW10) shown in FIG. 13. The comparison result from the comparator 1360 indicates presence or absence of a DOWN LINK signal of wireless LAN. On the bases of the comparison result, when the DOWN LINK signal for wireless LAN is detected, the switch 1309 operates to transmit the DOWN LINK signal. If it is not detected, the switch 1309 operates such that the UP LINK signal passes through the switch 1309.

Figure 23:
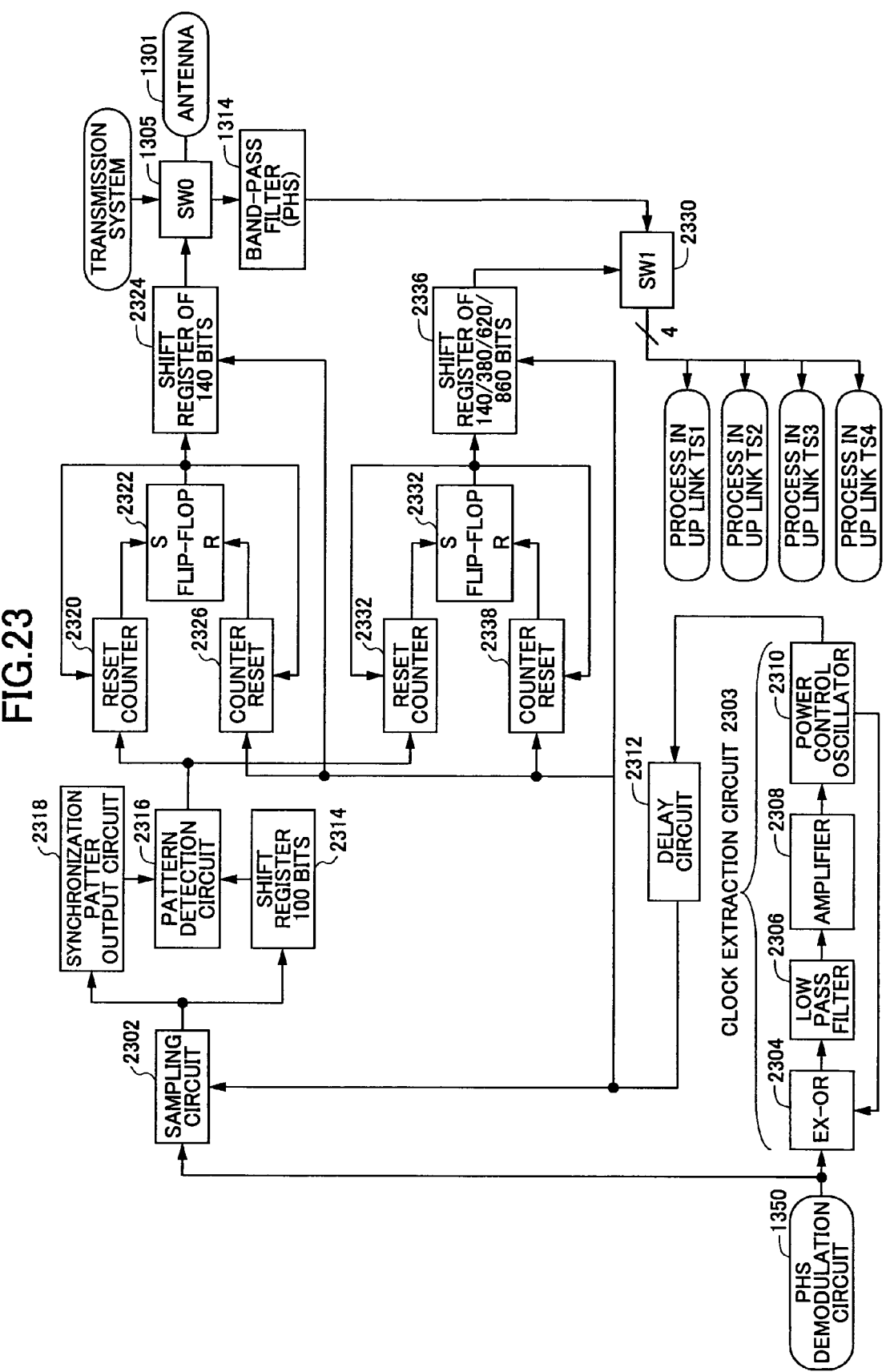
FIG. 23 is a functional block diagram of a slot synchronization circuit and a switching control circuit shown.

FIG. 23 is a functional block diagram of the slot synchronization circuit and the switching control circuit shown in FIG. 13. A demodulated signal demodulated by the PHS demodulation circuit 1350 is supplied to a sampling circuit 2302 and to a clock extraction circuit 2303. In the clock extraction circuit 2303, an exclusive-or circuit 2304 detects status change of the received signal, so that a clock signal is extracted by a low pass filter 2306, an amplifier 2308, and a power control oscillator 2310. The clock signal (a signal indicating a data change point or an edge) from the clock extraction circuit 2303 is supplied to a delay circuit 2312, so that a timing signal indicating a center timing between edges in the clock signal is output, and the timing signal is supplied to a sampling circuit 2302, counters 2326 and 2338, and shift registers 2324 and 2326.

The sampling circuit 2303 samples the demodulated signal in synchronization with the timing signal so that the sampled signal is supplied to a shift register 2314 in sequence. The shift-register 2314 includes a series of flip-flop circuits, for example. The shift register 2314 stores 100 bit sequence, for example, and shifts the bits each time when the sampling data is input. The data held in the shift register 2314 are input in the pattern detection circuit 2316. The pattern detection circuit 2316 receives a synchronization pattern, that is stored beforehand in the synchronization pattern output circuit 2318, from the synchronization pattern output circuit 2318. Then, the pattern detection circuit 2316 compares the sequence from the shift register 2314 with the pattern. When a pattern that agrees with the synchronization pattern is obtained, information that a pattern that agrees with the synchronization pattern is obtained is sent to the counters 2320 and 2332.

Figure 24:
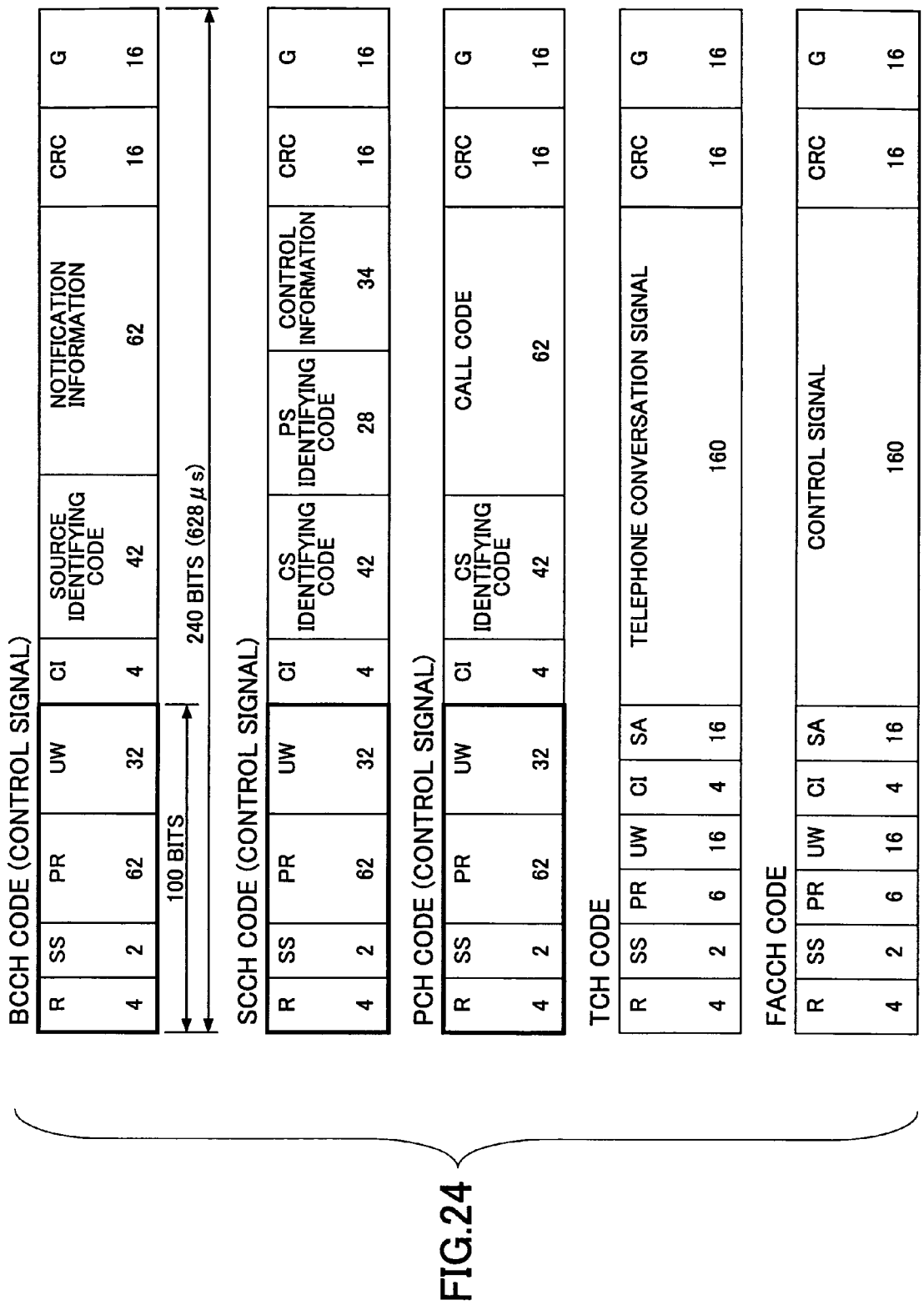
FIG. 24 shows examples of formats of signals for PHS.

FIG. 24 shows examples of formats of DOWN LINK signals of PHS. FIG. 24 shows five formats each having a length of 240 bits that corresponds to a length of one time slot. Each of BCCH, SCCH and PCH is a format for transmitting a control signal. Each of TCH and FACCH is a format for transmitting a telephone conversation signal. The format for the control signal commonly includes R, SS, PR and UW that form a predetermined pattern with a length of 100 bits as a whole. This predetermined pattern is stored in the synchronization pattern output circuit 2318 shown in FIG. 23 beforehand.

The counter 2320 shown in FIG. 23 counts the number of times of occurrence of a match of the pattern. For example, when the number reaches four, the counter 2320 outputs a signal for setting the flip-flop 2322. When the flip-flop 2322 is set, the counter 2320 is reset in response to that so as to start the count of the times again. A timing obtained by delaying a predetermined period (a period corresponding to 140 bits, for example) from a time when the flip-flop 2322 is set is obtained from the shift register 2324. Based on the timing, switching (switching from DOWN LINK line to UP LINK line) of the switch 1305 is performed. In addition, in response to the setting of the flip-flop 2322, the counter 2326 counts a predetermined number of bits corresponding to a period of the UP LINK line (240×4 bits, for example), and the counting result is supplied to the reset input of the flip-flop 2322. When the flip-flop 2322 is reset, a timing obtained by delaying a predetermined period (a period corresponding to 140 bits, for example) from a time when the flip-flop 2322 is reset is obtained from the shift register 2324. Based on the timing, switching (switching from UP LINK line to DOWN LINK line) of the switch 1305 is performed.

FIG. 22 shows output waveforms from the counters 2320 and 2332 counting the number of matching times of the synchronization pattern, counters 2326 and 2338 for counting the period of the UP LINK line and the DOWN LINK line, the shift register 2324 for delaying time by a period from the detected point to a slot boundary, and the like. As shown in the figure, in a slot TS4 that is a fourth DOWN LINK slot, a fourth synchronization pattern is detected. In response to that, outputs of the counters 2320 and 2332 rise, so that the flip-flops 2322 and 2334 are set. The timing at which the flip-flop 2322 is set is delayed by a period corresponding to 140 bits, and the timing is output from the shift register 2324. A time at which an output from the shift register 2324 rises indicates a start (end of DOWN LINK line) of the UP LINK line. On the other hand, in response to the setting of the flip-flops 2322 and 2334, the counters 2326 and 2338 are reset. The output status is changed after a period corresponding to 240×4 bits elapses. In response to the change, the flip-flops 2322 and 2334 are reset, and the timing of the reset is delayed by a period corresponding to 140 bits, and the signal is output from the shift register 2324. A time at which the output falls indicates an end of the UP LINK line (start of DOWN LINK line).

An UP LINK signal received by the antenna 1301 is supplied to the switch 2330 via the switch 1305 and the band-pass filter 1314. According to the control signal from the shift register 2336, the switch 2330 provides the UP LINK signal to each process component such that processes for each of times slots TS1~4 can be performed. The shift register 2336 detects an UP LINK/DOWN LINK switching timing and a switching timing of each time slot from the output of the flip-flop 2334. In the example shown in the figure, the shift register 2336 outputs a time delayed by a period corresponding to 140 bits from the UP LINK/DOWN LINK switching timing $t_0$, a time further delayed by 240 bits (380 bits from $t_0$) from the previous time, a time further delayed by 240 bits (620 bits from $t_0$) from the previous time, and a time further delayed by 240 bits (840 bits from $t_0$) from the previous time, so that the switch 2330 is properly switched according to the four time slots TS1~4 of the UP LINK line (refer to FIG. 22). After that, above-mentioned processes such as detection and reducing of the spurious signal are performed in each time slot.

The present invention is not limited to the specifically disclosed embodiments, and variations and modifications may be made without departing from the scope of the present invention.

The present application contains subject matter related to Japanese patent application No. 2005-029556, filed in the JPO on Feb. 4, 2005, the entire contents of which are incorporated herein by reference.

What is claimed is:

1. An antenna system comprising:
a plurality of antennas; and
a synthesizer configured to synthesize reception signals received by said plurality of antennas, respectively, wherein:
a signal obtained from the synthesis carried out by said synthesizer is given to a communication apparatus configured to carry out a first radio communication method in which an instruction to increase transmission power according to a reduction in reception quality is provided, wherein:

said antenna system further comprises:

a power control part, provided to correspond to one antenna of the plurality of antennas, and configured to carry out gain control on a signal received by said one antenna before the signal is given to the synthesizer;

a detecting part configured to detect that a spurious signal is included in the signal received by said one antenna; and a differential amplifier configured to determine whether the detected spurious signal exceeds a predetermined level or not, and generate a control signal to be supplied to the power control part upon determining that the spurious signal exceeds a predetermined level, wherein the power control part attenuates the signal received by said one antenna on the basis of the supplied control signal so as to reduce gain in the power control part and reduce power of the reception signal to be supplied to the synthesizer.

2. A control method of an antenna system which comprises a plurality of antennas and a synthesizer configured to synthesize reception signals received by said plurality of antennas, respectively, said method comprising:

giving a signal obtained from the synthesis carried out by said synthesizer to a communication apparatus configured to carry out a first radio communication method in which an instruction to increase transmission power according to a reduction in reception quality is provided, wherein:

said antenna system further comprises:

a power control part, provided to correspond to one antenna of the plurality of antennas, and configured to carry out gain control on a signal received by said one antenna before the signal is given to the synthesizer;

a detecting part configured to detect that a spurious signal is included in the signal received by said one antenna; and a differential amplifier configured to determine whether the detected spurious signal exceeds a predetermined level or not, and generate a control signal to be supplied to the power control part upon determining that the spurious signal exceeds a predetermined level, wherein the power control part attenuates the signal received by said one antenna on the basis of the supplied control signal so as to reduce gain in the power control part and reduce power of the reception signal to be supplied to the synthesizer.

* * * * *